US009774723B2

(12) United States Patent
Baldassari et al.

(10) Patent No.: US 9,774,723 B2
(45) Date of Patent: Sep. 26, 2017

(54) SYSTEM ARCHITECTURE FOR A WEARABLE DEVICE

(71) Applicant: Pebble Technology, Corp., Redwood City, CA (US)

(72) Inventors: François Olivier Baldassari, San Francisco, CA (US); Liron Mordechai Damir, San Francisco, CA (US); Tyler James Hoffman, Menlo Park, CA (US); Megan Elisabeth Knight, Mountain View, CA (US); Henry Levak, San Mateo, CA (US); Itai Vonshak, San Jose, CA (US)

(73) Assignee: Pebble Technology, Corp., Redwood City, CA (US)

( * ) Notice: Subject to any disclaimer, the term of this patent is extended or adjusted under 35 U.S.C. 154(b) by 0 days.

(21) Appl. No.: 15/012,641

(22) Filed: Feb. 1, 2016

(65) Prior Publication Data
US 2016/0246492 A1    Aug. 25, 2016

Related U.S. Application Data

(63) Continuation-in-part of application No. 14/922,058, filed on Oct. 23, 2015, and a continuation-in-part of application No. 14/922,045, filed on Oct. 23, 2015.
(Continued)

(51) Int. Cl.
*H04M 1/725* (2006.01)
*G06F 3/0484* (2013.01)

(52) U.S. Cl.
CPC ..... *H04M 1/72597* (2013.01); *H04M 1/7253* (2013.01); *G06F 3/04847* (2013.01); *H04M 1/72547* (2013.01)

(58) Field of Classification Search
CPC ............ G06F 3/04847; G06F 9/45508; G06F 3/04842; G06F 3/048; G06F 17/30873;
(Continued)

(56) References Cited

U.S. PATENT DOCUMENTS 8,751,602 B1   6/2014  Slonh
D733,142 S     6/2015  Solomon et al.
(Continued)

FOREIGN PATENT DOCUMENTS

EP      2504961        10/2012
EP   002655142-0001     3/2015
EP   002655118-0001     4/2015

OTHER PUBLICATIONS

Office Action issued in U.S. Appl. No. 14/887,394 dated Nov. 23, 2016.
(Continued)

*Primary Examiner* — Jennifer To
*Assistant Examiner* — Terri Filosi
(74) *Attorney, Agent, or Firm* — Rutan & Tucker, LLP

(57) ABSTRACT

Apparatuses and methods that generate and send interactive elements to a plurality of wearable electronic devices are discussed. One or more mobile applications and one or more remote backend servers may cooperate to send information in the interactive elements to one or more instances of a time synchronous application in order to bring different types of content such as timely and relevant data, events, and notifications to a user of a wearable electronic device without the user's intervention to actively retrieve the different types of content. The interactive elements may be generated and sent from any of i) a public application programming interface ("API") hosted on a server, ii) one or more mobile applications resident on one or more mobile computing devices, or iii) one or more remote backend servers. In addition, these sources may merely send content and commands for the interactive elements to the public API.

18 Claims, 13 Drawing Sheets

Related U.S. Application Data

(60) Provisional application No. 62/120,238, filed on Feb. 24, 2015.

(58) Field of Classification Search
CPC . G06F 2216/15; G06F 21/36; H04M 1/72597
USPC .......................................................... 715/811
See application file for complete search history.

(56) References Cited

U.S. PATENT DOCUMENTS

| | | | |
|---|---|---|---|
| D743,278 S | 11/2015 | Solomon et al. | |
| D745,515 S | 12/2015 | Solomon et al. | |
| D750,625 S | 3/2016 | Solomon et al. | |
| D752,583 S | 3/2016 | Solomon et al. | |
| D755,178 S | 5/2016 | Solomon et al. | |
| D760,717 S | 7/2016 | Solomon et al. | |
| D761,262 S | 7/2016 | Solomon et al. | |
| 9,560,629 B2 | 1/2017 | Migicovsky et al. | |
| 2007/0195007 A1 | 8/2007 | Bear et al. | |
| 2008/0260274 A1 | 10/2008 | Winder et al. | |
| 2013/0007665 A1 | 1/2013 | Chaudhri et al. | |
| 2013/0040610 A1 | 2/2013 | Migicovsky et al. | |
| 2013/0339091 A1 | 12/2013 | Humay | |
| 2014/0173459 A1 | 6/2014 | Gaiser et al. | |
| 2015/0019365 A1 | 1/2015 | Vieira et al. | |
| 2015/0046828 A1* | 2/2015 | Desai ..................... | G06F 1/163 715/739 |
| 2015/0126117 A1 | 5/2015 | Wong et al. | |
| 2015/0223033 A1 | 8/2015 | Migicovsky et al. | |
| 2015/0223034 A1 | 8/2015 | Migicovsky et al. | |
| 2015/0253972 A1 | 9/2015 | Zavattaro et al. | |
| 2015/0283455 A1 | 10/2015 | Nova | |
| 2015/0306498 A1 | 10/2015 | Tornqvist | |
| 2015/0333302 A1 | 11/2015 | Johns et al. | |
| 2015/0334772 A1 | 11/2015 | Wong et al. | |
| 2015/0379126 A1 | 12/2015 | Livshits et al. | |
| 2016/0094665 A1* | 3/2016 | Kellmereit ............ | H04L 67/142 709/203 |

OTHER PUBLICATIONS

Office Action issued in U.S. Appl. No. 14/922,045 dated Jan. 29, 2016.
Office Action issued in U.S. Appl. No. 14/922,045 dated Jun. 8, 2016.
Office Action issued in U.S. Appl. No. 14/922,058 dated Feb. 18, 2016.
Office Action issued in U.S. Appl. No. 14/922,058 dated Aug. 23, 2016.
Office Action issued in U.S. Appl. No. 14/922,058 dated Feb. 27, 2017.
Office Action issued in U.S. Appl. No. 15/012,616 dated Jun. 16, 2016.
Office Action issued in U.S. Appl. No. 15/012,616 dated Nov. 22, 2016.
Beal, Vangi, "What is GUI—Graphical User Interface?" Webopedia Definition, http://www.webopedia.com/TERM/G/Graphical_User_Interface_GUI.html,. 2 pgs., accessed Feb. 15, 20176.
Beal, Vangi, "What is a Program?" Webopedia Definition, http://www.webopedia.com/TERM/P/program.html. 2 pgs., accessed Feb. 17, 20176.
*CFMT, Inc.* v. *Yieldup Intern. Corp.*, 349 F.3d 1333, 1342 (Fed. Cir. 2003).
In re Ochiai, 71 F.3d 1565, 1572 (Fed. Cir. 1995).
In re Royka, 490 F.2d 981, 985 985 (CCPA 1974).
*Ex Parte Wada and Murphy*, U.S. Patent and Trademark Office Board of Patent Appeals and Interferences Decision on Appeal for Appeal No. 2007-3733 dated Jan. 14, 2008, 9 pages. Alexandria, Virginia USA.
"Graphical user interface", from Wikipedia, https://en.wikipedia.org/wiki/Graphical_user_interface 9 pgs., accessed Feb. 15, 2017.
"Json"—Wikipedia https://en.wikipedia.org/wiki/JSON 13 pgs., accessed Feb 16, 2017.
"Json: What It Is, How It Works, & How to Use It", Copter Labs, https://www.copterlabs.com/json-what-it-is-how-it-works-how-to-use-it 1 pg., accessed Feb. 16, 2017.
"Object (computer science)"—Wikipedia—https://en/wikipedia.org/wiki/Object_(computer_science) 4 pgs., accessed Feb. 15, 2017.
"What is User Interface (UI)?" Webopedia Definition, https://www.webopedia.com/TERM/U/user_interface_html 3 pgs., accessed Feb. 15, 2017.
"What is the difference between a software program and graphic user interface?", https://www.quora.com/What-is-the-difference-between-a-software-program-and-graphic-user-interface 2 pgs., accessed Feb. 15, 2017.
"What is an Object? (The Java™ Tutorials > Learning the Java Language > Object-Oriented Programming" https://docs/oracle.com/javcase/tutorial/java/concepts/object.html, 2 pgs., accessed Feb. 15, 2017.

* cited by examiner

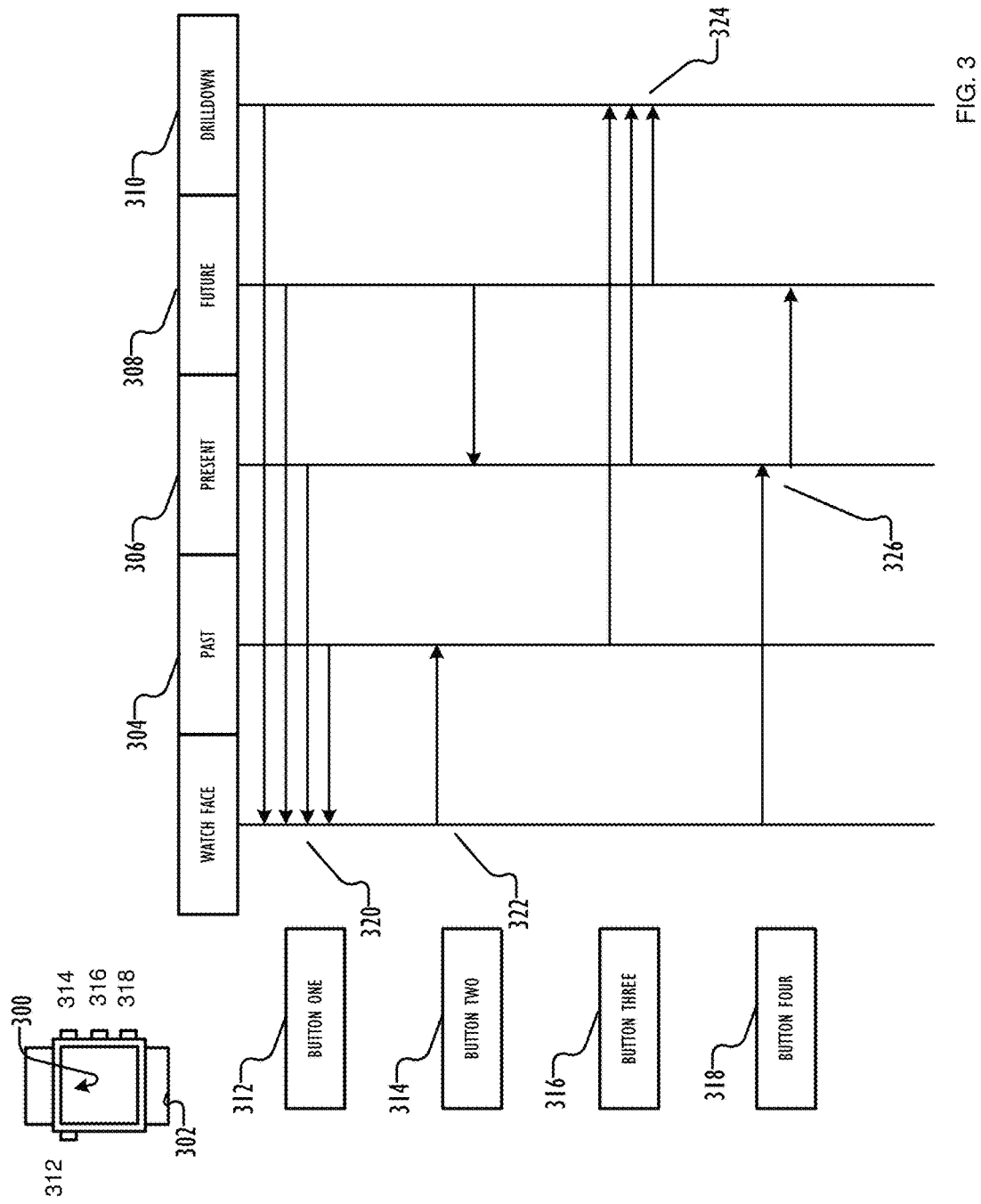

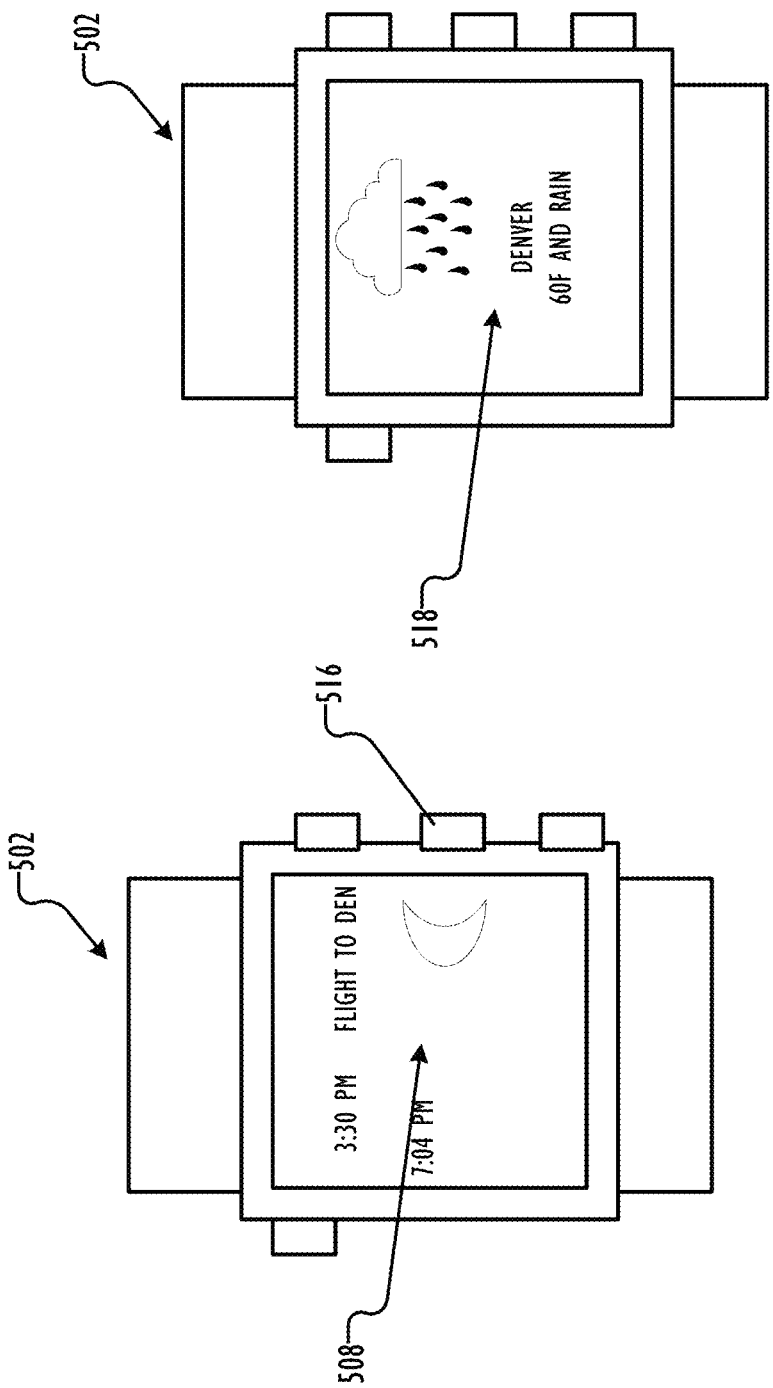

SYSTEM ARCHITECTURE FOR A WEARABLE DEVICE

CROSS REFERENCE TO RELATED APPLICATIONS

This Application claims priority to U.S. Provisional Application Ser. No. 62/120,238 entitled "A SMARTWATCH OR OTHER NOTIFICATION DEVICE CONFIGURED TO INTUITIVELY INTERACT WITH A USER BASED ON TIME AND THE WAY THE USER USES THE DEVICE" filed Feb. 24, 2015, and is a continuation in part of U.S. application Ser. No. 14/922,058, titled SMARTWATCH OR OTHER WEARABLE DEVICE CONFIGURED TO INTELLIGENTLY INTERACT WITH A USER filed Oct. 23, 2015, and is a continuation in part of U.S. application Ser. No. 14/922,045, titled "SMARTWATCH OR OTHER WEARABLE DEVICE CONFIGURED TO INTELLIGENTLY INTERACT WITH A USER," filed Oct. 23, 2015, all three of which are incorporated by reference in their entirety herein.

TECHNICAL FIELD

An example described herein generally relates to a smart watch.

BACKGROUND

Historically wearable computing devices, including smart watches, have suffered from numerous design flaws that have fallen primarily in two categories: large size or poor functionality.

Due to the constraints of wearable computing device form factors, it is difficult to integrate high performance computing technology with an interface that is easy to use. Past wearable computing devices were often large and bulky. The size was usually a function of the power requirements for the included display as well as computational electronics.

BRIEF SUMMARY

In general, one or more wearable computing devices designed to accept interactive elements are discussed. Apparatuses and methods that generate and send interactive elements to a plurality of wearable electronic devices are also discussed.

In an embodiment, one or more mobile applications and one or more remote backend servers may cooperate to send information in the interactive elements to the instances of the time synchronous application resident in their wearable electronic device in order to bring different types of content such as timely and relevant data, events, and notifications to a user of that wearable electronic device without the user's intervention to actively retrieve the different types of content. The interactive elements may be generated and sent from any of i) a public application programming interface hosted on a server, ii) one or more mobile applications resident on one or more mobile computing devices, and iii) one or more remote backend servers. In addition, these sources may merely send content and commands for the interactive elements to the public application programming interface, which can transform the content and commands into a format of an interactive element. The interactive elements may be routed to the time synchronous application in many ways. 1) The one or more interactive elements may be directly routed from either a mobile application or a backend server to an instance of a time synchronous application on its own wearable electronic device. 2) The one or more interactive elements may be routed via through the public application programming interface to the instance of the time synchronous application on its own wearable electronic device. 3) The one or more interactive elements may be routed via through the public application programming interface to the one or more mobile applications and then to the instance of the time synchronous application on its own wearable electronic device. The public application programming interface is configured to cooperate with a overseeing module to i) review the interactive elements, ii) transform the at least content into a format of a first interactive element, if needed, and iii) send the one or more interactive elements to the instances of the time synchronous applications resident in their wearable electronic devices directly or indirectly via the mobile application. Various sources such as a mobile application, the time synchronous application (itself), and a program in the cloud may be configured to synchronize the interactive elements inserted into instances of the time synchronous application.

BRIEF DESCRIPTION OF DRAWINGS

FIG. 3 is a diagram of an embodiment of a time synchronous application having navigational states utilizing chronological ordering for displayed interactive elements.

FIGS. 5A and 5B illustrate of an embodiment an interactive element configured to represent any of weather details or real time information updates such as sport scores that will be shown on the display screen of the first wearable computing device.

FIGS. 12A, 12B, and 120 are illustrations of an embodiment demonstrating a technique for receiving interactive elements and taking an action in the interactive element.

Figure 1:
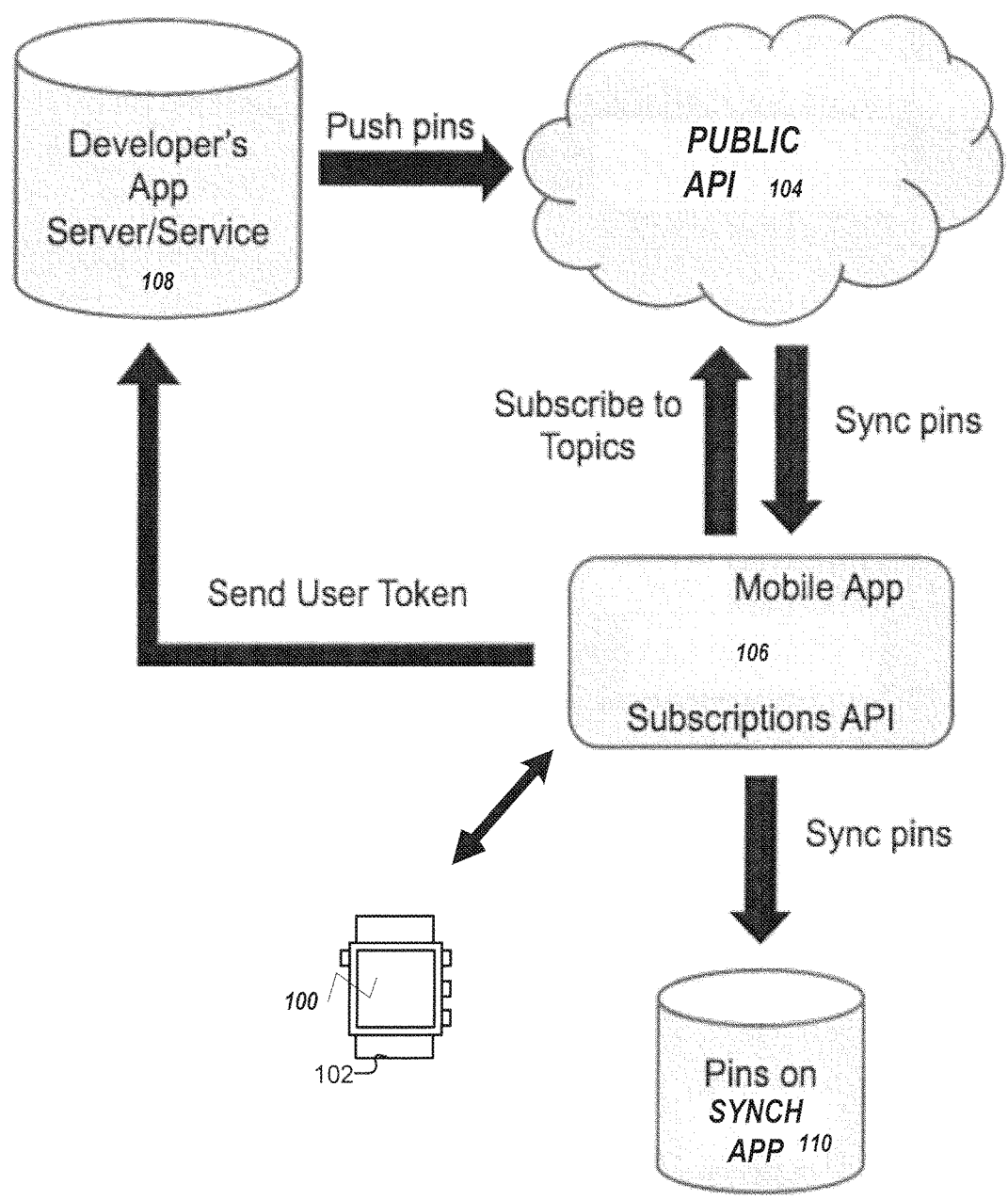
FIG. 1 is a flowchart of an embodiment illustrating a system architecture for generating, receiving, processing, updating, and broadcasting interactive elements.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DESCRIPTION OF EXAMPLES

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. The specific details set forth are merely exemplary. The specific details discussed in one embodiment may be reasonably implemented in another embodiment. The specific details may be varied from and still be contemplated to be within the spirit and scope of the present design.

Apparatuses and methods that generate and send interactive elements to a plurality of wearable electronic devices are also discussed. A first wearable electronic device may have a time synchronous application coded to display interactive elements. The wearable electronic device may have a memory, a processor, a communication circuit, and a display screen located in the first wearable electronic device, which are all configured to cooperate with each other. The time synchronous application is coded to be resident in the memory of the first wearable electronic device and to be executed by the processor. The communication circuit and the time synchronous application cooperate to receive one or more interactive elements. The time synchronous application is configured to illustrate contents of the one or more interactive elements on the display screen of the first wearable computing device. The time synchronous application illustrates contents of the one or more interactive elements, synchronized in a context of time, into a logical order of displayed interactive elements on the display screen. The time synchronous application displays different types of content such as i) timely and relevant data, ii) calendar events, and iii) portions of or whole notifications from the one or more interactive elements, synchronized in the context of time, within the time synchronous application. Thus, the user does not need to leave the time synchronous application to go into another application in order to view the contents of the interactive element and/or take actions in response to the displayed contents. The input communications circuit receives the one or more interactive elements over a network from any of i) a public application programming interface hosted on a server, ii) one or more mobile applications resident on one or more mobile computing devices, or iii) one or more remote backend servers. These multiple sources can push an interactive element onto the chronological timeline of the time synchronous application of wearable electronic device without the user needing to take an action to add that item. At least a first mobile application, such a partner mobile application that is configured to cooperate with the time synchronous application on the wearable electronic device, is coded to generate and 1) send interactive elements directly to the time synchronous application on the wearable electronic device or 2) send at least content for the interactive elements to the public application programming interface. The public application programming interface is configured to cooperate with a overseeing module to i) review the interactive elements, ii) transform the at least content into a format of a first interactive element, if needed, and iii) send the one or more interactive elements to the time synchronous application resident in the first wearable electronic device, directly or indirectly via the one or more mobile applications. The mobile applications and the remote backend servers send information in the interactive elements to the time synchronous application resident in the first wearable electronic device in order to bring different types of content such as timely and relevant data, events, and notifications to a user of that wearable electronic device without the user's intervention to actively retrieve the different types of content. The interactive elements can contain multiple different types of content, each of which may have its own actionable responses.

In an embodiment, structurally and functionally, an interactive element is a software data object that contains information such as title and times, as well as more advanced content such as notification data or actions that can be carried out from the view of the interactive element itself. In addition, the software object of the interactive element can have multiple layouts, where a user activates an element of the interactive element and gets a more detailed layout view of the element and its corresponding data content and its potential actions to take.

Overall, architecturally, multiple sources may generate and send out interactive elements to the group of wearable electronic devices such as discussed in, for example, FIGS. 1-5. The group of wearable electronic devices can then take selectable actions to interact with each other such as discussed in, for example, FIGS. 7-13.

FIG. 1 is a flowchart of an embodiment illustrating a system architecture for generating, receiving, processing, updating, and broadcasting interactive elements. The system architecture can include an instance of the time synchronous application 100 on each wearable electronic device 102, a multitude of a wearable electronic devices including the first wearable electronic device 102, a public application programming interface (API) 104, one or more mobile applications 106 on the mobile device, and one or more remote backend servers 108, for example a developer's app server/service, that all cooperate in a number of ways to generate and send interactive elements to the time synchronous application 100.

Each item on the time synchronous application 100 may be its own interactive element. An interactive element can have information contained within and/or attached to it, which is used to show the information to the user. The information may include a layout, a title, a start time, and actions allowed from that instance of the interactive element. The information may also be dynamic in nature, for example, content in the fields of the interactive element may change as the device is moved and over time. The information in the fields is updated by one or more routines supplying information from sensors and/or apps contained in the wearable electronic device 102. For example, GPS coordinates that translate to a bearing and time reference to a clock, then can be used to update the information for a count down. As discussed, later executable software may also be stored in the fields of the interactive element. Both of these types of content configured to be stored in these fields are very useful for one wearable device to detect another in location and then interact with each other. When the user of the wearable electronic device 102 is viewing their time synchronous application 100, they can use the information provided about the immediate past, immediate future, and present to make decisions about how they plan the rest of their day and how to respond to any missed notifications or events conveyed by the interactive element.

The public API 104 system, backend servers 108, and mobile application(s) 106 populate the user's time synchronous application 100 automatically with items such as calendar appointments, weather details, notifications, fitness updates, real time updates including sports scores, etc.

The time synchronous application 100 on the wearable electronic device 102, the public API 104, one or more mobile applications 106 on the mobile device, and one or more remote backend servers 108 all cooperate to generate and send interactive elements to the multitude of wearable electronic devices. The communications circuit and time synchronous application 100 of the wearable electronic device 102 may receive the one or more interactive elements from multiple different data sources, including the one or more mobile applications 106 and the one or more remote third party backend servers 108. Thus, one or more interactive elements are generated and sent over a network from any of i) the public API 104 hosted on a server, ii) the one or more mobile applications 106 resident on one or more mobile computing devices, iii) the one or more remote backend servers 108. and/or iv) combinations of these three.

The mobile applications 106 and the remote backend servers 108 send information in the interactive elements to the time synchronous application 100 resident in the wearable electronic device 102 in order to bring different types of content such as timely and relevant data, events, and notifications to a user of that wearable electronic device without the user's intervention to actively retrieve the different types of content.

In an embodiment, all of the one or more interactive elements are generated and routed over the network from the public API 104 hosted on the server, as the central delivery source, to the instances of the time synchronous applications resident in their wearable electronic devices. Therefore, all sources, in this embodiment, only push interactive elements via the public API 104.

Yet, in an embodiment, multiple sources route interactive elements to the wearable electronic devices. A first set of the one or more interactive elements can be generated and sent over the network, such as the Internet, from the public API 104 hosted on the server. A second set of the one or more interactive elements can be generated and sent over a second network, such as a local wireless network, from the one or more mobile applications 106 resident on one or more mobile computing devices. Also, a third set of the one or more interactive elements can be generated and sent from the one or more remote backend servers 108 directly to the instances of the time synchronous applications resident in their wearable electronic devices or indirectly via the public API 104. Thus, the one or more interactive elements can be directly routed to each instance of a time synchronous application 100 on its own wearable electronic device 102. Additionally, the one or more interactive elements can also be routed via through the public API 104 to the instance of the time synchronous application 100 on its own wearable electronic device 102. In addition, one or more interactive elements can also be routed via through the public API 104 to the one or more mobile applications 106 and then onto one or more instances of the time synchronous application 100 on its own wearable electronic device.

In an implementation, the public API 104, via a partner mobile application 106 on the mobile device, is the main source pushing the one or more interactive elements into the time synchronous application 100 on the wearable electronic device 102. Thus, the public API 104 is configured to send the one or more interactive elements over a network to a partner mobile application 106, such as a Pebble mobile application, on the mobile computing device. The communications circuit receives the one or more interactive elements over a local area network from the cooperating application 106 on the mobile device. Therefore, some sources only push interactive elements via the public API 104 then to the partner mobile application 106 and then to the time synchronous application 100.

Yet, in an implementation, some or all of these interactive elements originate on the mobile device, such as a smart phone, and are sent straight to the wearable electronic device 102, such as smart watch, not via the public API 104. Thus, the one or more mobile applications 106 can be configured to generate and send interactive elements directly to the time synchronous application 100 on the wearable electronic device 102.

One or more mobile applications 106 from various developers can be code to send at least content and commands for the interactive elements to the public API 104, in order to be transformed into an interactive element. Some sources push interactive elements objects via mobile applications 106.

The one or more remote backend servers 108 also may generate and 1) send interactive elements to the public API 104 or 2) send at least content for the interactive elements to the public API 104. This method allows developers to push data to instances of the time synchronous application 100 using their own backend servers 108. Thus, some sources push interactive elements via the public API 104 but may generate their own formatted interactive elements or merely push data to be transformed into an interactive element.

As discussed, merely content and potentially other data or commands for the interactive elements can be generated and sent to the public API 104, instead of a fully formed interactive element. The public API 104 can be configured to cooperate with a module to i) review the interactive elements, ii) transform the content and/or commands into a format of an interactive element, if needed, and iii) send the one or more interactive elements to the instances of the time synchronous application 100 resident in their wearable electronic devices, directly or indirectly via the mobile applications 106.

The API 104 servers have a module to manage the currently available topics, interactive elements, and data for the timeline-enabled application. All or just some of the interactive elements that are delivered to users can pass through this service. When a developer's remote server pushes an interactive element, the interactive element can be sent to this service for distribution to the applicable users.

In an embodiment, when a developer wants to push interactive elements to a smart watch, they can do so from their own third-party server. The third-party server generates interactive elements using topics that the user of a watchapp subscribes to, either for all users or just those that elect to be subscribed, or uses user tokens received to target individual users.

Thus, App developers can use the public web API 104 to provide data to users of instances of the time synchronous application 100. Developers may have a simple web server to enable them to process and send the data they want to display in the time synchronous application 100 as interactive elements. Each interactive element represents a specific item in the past or the future, and will be shown on the wearable electronic device 102 once pushed to the public web API 104 and synchronized with the wearable electronic device 102 via a partner mobile application.

As discussed above, the input communications circuit of the wearable electronic device 102 can be configured to receive the one or more interactive elements over a network from any of i) a public API 104 hosted on a server, ii) one or more mobile applications 106 resident on one or more mobile computing devices, or iii) one or more remote backend servers 108.

Next, the mobile application 106 can be also responsible for inserting interactive elements directly into the user's time synchronous application 100 for their upcoming calendar events. The partner mobile application 106 on the mobile computing device is charged with inserting interactive elements directly into the time synchronous application 100 on the first wearable electronic device 102.

Likewise, the partner mobile application 106 cooperating with the time synchronous application 100 resident on the wearable electronic device 102 can be responsible for synchronizing the interactive elements visible on the wearable electronic device 102 with those that are currently available in the cloud. The partner mobile application 106 may synchronize the interactive elements. The partner mobile application 106 resident on the mobile device is configured and responsible for synchronizing, an order in the context of time, i) all of the interactive elements for the instance of the time synchronous application 100 in the wearable electronic device 102 with ii) all possible interactive elements that are currently available in a database in the cloud 110, which the instance of the time synchronous application 100 in the wearable electronic device 102 is configured to make the interactive elements visible on the display screen of the first wearable electronic device 102.

Likewise, the server hosting the public API 104 may synchronize the interactive elements. An emulator on the server hosting the public API 104 is configured to emulate the time synchronous application 100 in order to support all of the instances of the time synchronous application 100 by having code to automatically synchronize all of the interactive elements in the ordered context of time. All of the interactive elements are stored in a memory cooperating with the server. The synchronization occurs on a set periodic basis, such as every 30 seconds. The synchronized order of all of the interactive elements is pushed to individual instances of the time synchronous application 100 using the server.

Interactive elements may be created and updated, for example, using HTTPS requests to the public web API 104.

Figure 2:
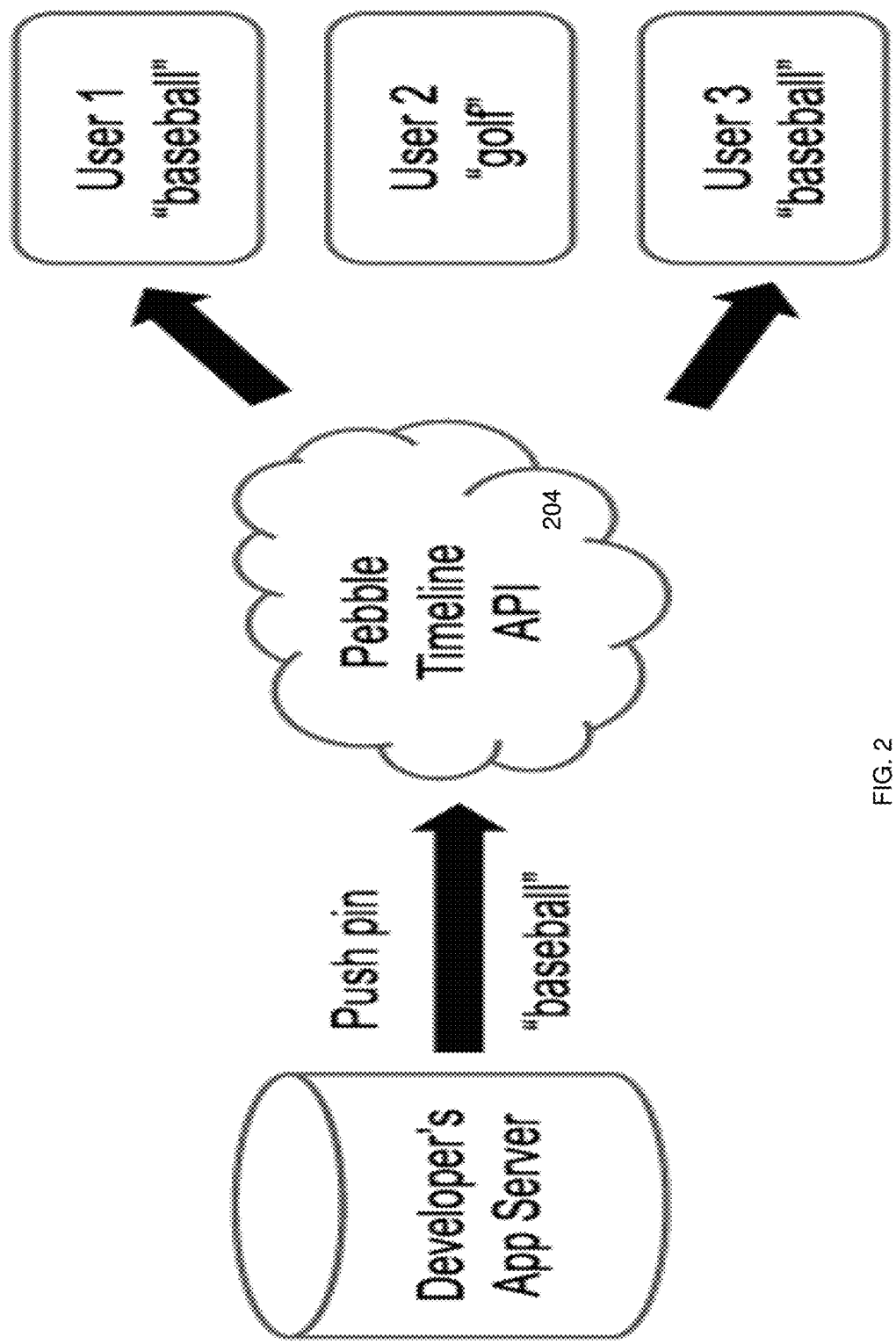
FIG. 2 is a diagram of an embodiment of the public API having an intelligence routine configured to be flexible enough to enable pushing the one or more interactive elements to the wearable electronic devices in distinct ways.

FIG. 2 is a diagram of an embodiment of the public API having an intelligence routine configured to be flexible enough to enable pushing the one or more interactive elements to the wearable electronic devices in distinct ways. The intelligence routine cooperating with the public API 204 is flexible enough to enable pushing the interactive elements to the wearable electronic device in one or more of the following three distinct ways:

i) The intelligence routine can push a given interactive element, in mass, to all instances of the time synchronous application resident on their corresponding wearable electronic devices with a developer's application that is the source of the content in the given interactive element being pushed. Each developer sends their one or more interactive elements to all users of their application.

ii) The intelligence routine can push the interactive element to merely a first subset of instances of the time synchronous application resident on their corresponding wearable electronic devices that cooperate with the developer application that is the source of the content in the given interactive element being pushed. The first subset can be determined by use of a selection criteria, such as a configuration page, in the developer's application or in the partner mobile application to allow users to subscribe to different topics within the first application to customize their experience and merely receive interactive elements with content on the selected topics they have subscribed/selected/want to see. Thus, in this way, developers can use a configuration page in their application to allow users to subscribe to different topics within their application to customize their experience and only receive data they want to see. In the figure, the interactive element broadcast with the topic 'baseball' can be received by users and 3, but not user 2 who has subscribed to the 'golf' topic but not the 'baseball' topic.

iii) The intelligence routine can push the interactive element to merely a second subset of instances of the time synchronous application on the plurality of wearable electronic devices, including the first wearable electronic device, that cooperate with the developer application that is the source of the content in the one or more interactive elements being pushed. The second subset is individually selected targeted users and determined by based on any of i) meta data known about each selected targeted user corresponding to content of the interactive element being pushed, ii) a token that corresponds to a custom list of target individuals that have an instance of the first application or tokens that correspond to individual wearable electronic devices, and iii) any combination of these two. Developers can also send the user's token to their own remote server to maintain a custom list of users and to target individuals if the application requires it. Developers can use a token to target individual users. This adds another dimension to how personal an interactive element can become, allowing interactive pins to be customized to the user in more ways than just their topic preferences. The token can be unique for each user & application combination. This can be used by an application's third party backend server to selectively send interactive elements only to those users who require them; and thus, target users individually for complete personalization.

In an embodiment, the intelligence routine can be configured to push the interactive element in all three (i, iii) of the above distinct ways to the time synchronous application.

Referring back to way ii, in an embodiment, developers can use a watch app or mobile application to subscribe their users to interactive element sources called 'topics' depending on their preferences. This allows the third party server to push data in interactive elements or simply data to the public API 204 to a large number of users at once. The server will generate interactive elements using topics that the watch app subscribes to (either for all users or just those that elect to be subscribed) or user tokens received to target individual users. The server sends events, updates, or notifications via the interactive element to all users of their mobile application or watchapp. The mobile application cooperating with the time synchronous application is configured to allow a developer to use a configuration page to give users the choice of which interactive elements they receive via which topics they are subscribed to.

FIGS. 3-5B go over possible structural and functional implementations of interactive elements and the time synchronous application that displays them.

FIG. 3 is a diagram of an embodiment of a time synchronous application having navigational states utilizing chronological ordering for displayed interactive elements. The time synchronous application 300 on the wearable electronic device 302 may include any application that is configured to keep a time synchronized organization of relevant and timely data ii) calendar events, iii) and notifications. This can come from at least two of i) personal communication interactions, ii) past and future event information, and iii) factual information, each of which are logged or scheduled in the one or more time synchronous applications 300. The time synchronous applications 300 can include but are not limited to a timeline application and a calendar application. The time synchronous applications 300 can reside either on the wearable electronic device 302, on a server or on a mobile computing device, such as a smart phone, that can cooperate and communicate with the wearable electronic device 302.

Note, an application herein described includes but is not limited to software applications, mobile apps, and programs that are part of an operation system application.

The time synchronous application 300 is configured to display contents of the one or more interactive elements, synchronized in a context of time, into a logical order of displayed interactive elements on the display screen. The time synchronous application 300 is coded to display different types of content such as i) timely and relevant data, ii) calendar events, iii) portions of or whole notifications from the one or more interactive elements. This information may come from content such as factual information, as well as personal communication interactions, synchronized in the context of time, within the time synchronous application 300.

Personal communication interaction is a subset of the information elements that deal with a user's personal interactions with others. These information elements are distinguished from other information elements in that they have a characteristic that makes them unique to the user. Examples include but are not limited to short message service (SMS), emails, texts, tweets, fitness metrics, missed telephone calls, Instagram and Facebook notifications.

Event information is a subset of the information elements that deal with a user's scheduling. Event information is usually a time-based occurrence or series of occurrences for which the user is affected. Examples include but are not limited to calendar entries and reminders.

Factual information is a subset of the information elements that deal with published facts for which the user exhibits an interest. Fact-based information are readily available information points, that can be in the public domain, and that allow the user to better understand the world around him or her. Examples include but are not limited to sports scores, stock ticker information, weather updates, horoscope information, fitness information, and news updates.

Horizontally along the top of FIG. 3 are the one or more interactive elements are synchronized in a context of time past 304, present 306, future 308 on, for example, a displayed watch face. Additionally, each interactive element may have a drill down capacity to another layout 310 of the user's selection of an item.

Vertically along the left of FIG. 3 are software based or physical push buttons 312-318 identified corresponding to those on the wearable computing device 302. Button one 312 corresponds with a return state button. Button two 314 corresponds with a backward navigational motion through time. Button three 316 corresponds with a selection action. Button four 318 corresponds with a forward navigational motion through time.

An interactive element may be of a first type of interactive element configured to represent a specific event in the past, the present, or the future, sent or updated by the mobile applications or the remote backend server, and will be shown on the display screen of the first wearable computing device once the interactive element is pushed to the public web API and then forwarded onto the wearable electronic device to be synchronized into logical order of displayed interactive elements on the time synchronous application 300.

The time synchronous application 300 is coded to display the interactive elements on the display screen. The time synchronous application 300 is coded to cooperate with the one or more software based buttons or physical buttons 312-318, for the wearable electronic device 302 in order to scroll forward in time as well as backward in time in the synchronized order of the interactive elements.

Button one 312 acts as a state reset button. For example, no matter the state at which the wearable computing device 302 is currently operating in, button one 312 returns it to the watch face state, as depicted by button one events 320.

Button two 314 acts as a past state 304 initiator and the user can scroll backwards in time. The user navigates into the past state 304, is by depressing button two 314 from the watch face state, which is depicted by the two events 322.

Button three 316 acts as a drill down state 310 initiator. The drill down state 310 may be entered in from the past state 304, the present state 306, and the future stare 308, as depicted by the button three events 324.

Button four 318 provides access to both the present state 306 as well as the future stare 308. As depicted by the button four events 326, the initial push of button four 318 moves the wearable computing device 302 into the present state 306. Once in the present state 306, a subsequent push of button four 318 moves the wearable computing device 302 into the future slate 306. Note, in some embodiments, input components other than buttons 312-318, such as voice commands, may be used to trigger the above functionality.

The time synchronous application 300 has an interface to reveal information in the form of an interactive element that a user wants to see in context of time. The software object of the interactive element has multiple layouts that allows the interface to display just the right information for user in the moment and the drill down feature can expand the window to see more information and/or allow the user to take an action based on the interactive element content.

In some embodiments, the wearable electronic device 302 can cooperate with a scrolling mechanism or rotating bezel as an input device.

The time synchronous application 300, such as a timeline application, has a graphical user interface that is configured to reveal information in the form of an interactive element object that is actionable and displays one or more programmed actions that the user to take based on content in the interactive element.

Figure 4B:
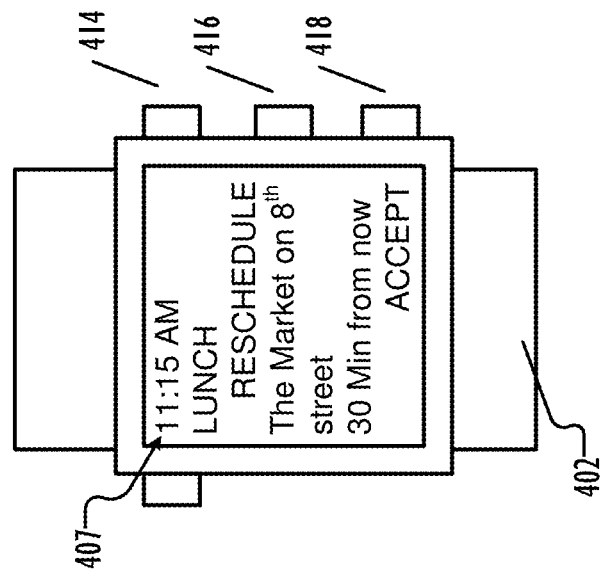
FIGS. 4A and 4B are diagrams of an embodiment of chronological ordering of displayed interactive elements with a first layout and a given interactive element with a second layout view.
Figure 4A:
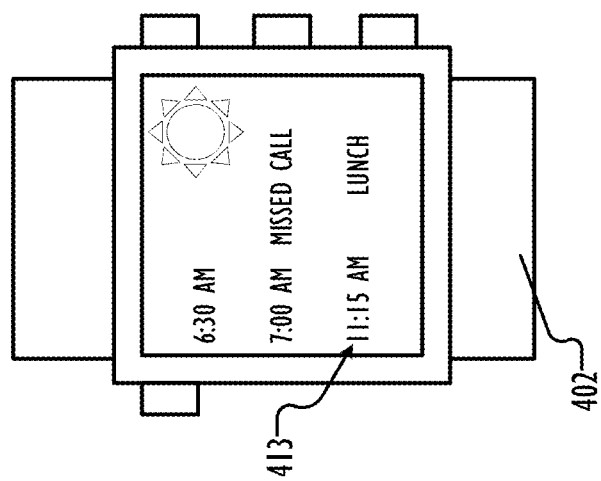

FIGS. 4A and 4B are diagrams of an embodiment of chronological ordering of displayed interactive elements with a first layout and a given interactive element with a second layout view. The time synchronous application illustrates a chronological ordering of displayed interactive elements in FIG. 4B with a first layout. The time synchronous application illustrates a given interactive element with a second layout view. The time synchronous application, such as a timeline application, has a graphical user interface that is configured to reveal information in the form of an interactive element object that a user of the wearable electronic device wants to see ordered in the context of time. The interactive element object has the multiple layouts in different visual formats to allow the graphical user interface to display just the right amount of information for user of the wearable computing device in the moment, and is actionable to expand window to see more information.

The wearable electronic device 402 provides an input device to navigate the ordered interactive elements. In this example, buttons 414, 416, 418 are provided for navigation, however, other implementations including a touch screen, voice commands, or gestures could be used. Specific to this example a button 414 is provided for retreating navigation. The retreating navigation button 414, when pushed, changes the watch face to display ordered interactive elements. In this example, the interactive element 407 is a calendar appointment for lunch.

As displayed here, different ordered interactive elements 413 types can be displayed simultaneously. First, displayed at 6:30 AM, is an interactive element illustrated as a weather event of notice, sunrise. Second, displayed at 7:00 AM is an interactive element representing a personal communication information in the form of a missed telephone call. Third, displayed at 11:15 AM, is an interactive element for a calendar event for a lunch meeting. The interactive element may be a calendar event with actions that allows accepting, rescheduling, etc. with the selected action. Each one of these interactive elements 413 come from different sources and are unrelated to one another, yet are arranged and placed in a useful view for the user.

Various member data fields will determine how the unassociated information is displayed to the user. The "type" member data fields also may determine available members data fields and their layout. For example, a "calendar" type will have different member data fields than a "sports update" type to accommodate information relating to that specific event.

An interactive element is a software data object, such as a pin, that has one or more fields to contain information, such as title and times, or more advanced data, such as notification data, or actionable functions that can be carried out from a first view without having to open another application. The software data object also has multiple layouts each containing and displaying different sets of conveyed information. Each layout allows a user of the time synchronous application to activate on an element of the interactive element to change from a base layout view and get a more detailed layout view of the interactive element and its corresponding data content. In an embodiment, the interactive element may be software object, a data object, or a combination of both.

The interactive element has two or more layout objects, which each layout object contains a view layout and reference to one or more fields containing content to be conveyed and shown in that layout object, in order to allow a resulting set of layout objects of first interactive element to be customized. The layout object can be used to describe any message shown in a customizable layout. This includes an interactive element in the time line of the time synchronous application, (e.g.) a notification, reminders, etc. Developers can choose between different layout types and customize them with attributes.

Each ordered interactive element has a specific layout that may be configured for effective viewing by the user. As mentioned above, the ordered interactive element may be represented as a JSON object. A layout member may be used to present the information in a given fashion. A layout may comprise other data members including type, title, subtitle, body, and icon.

```
{
    "id": "example-element", note another example of an id may be
a unique code such "017de94e-40ce-49b4-9aeb-1a0a53c8a96e"
    "time": "2015-03-19T18:00:00Z",
    "duration": 12,
    "layout": {
        "type": "genericElement",
        "title": "News at 6 o'clock",
        "tinyIcon": "system://images/NOTIFICATION_FLAG"
    }
}
```

The interactive element is a software data object that contains all of the information required to be displayed on the wearable electronic device, and can be coded in the JavaScript Object Notation object format. The interactive element has one or more fields to contain basic information such as title and times, as well as one or more fields that contain actionable functions that can be carried out from a view of the interactive element. The actionable functions includes one or more programmed mechanisms on how to respond to a notifications or event conveyed by the interactive element.

Note: the type field can be always required to determine the type of layout being displayed.

| Field | Type | Function |
| --- | --- | --- |
| Type | String | The type of layout the interactive element will use. See Interactive element Layouts for a list of available types. |
| Title | String | The title of the interactive element when viewed. |
| Subtitle | String | Shorter subtitle for details. |
| Body | String | The body text of the interactive element. Maximum of 512 characters. |
| tinyIcon | String | URI of the interactive element's tiny icon. |
| smallIcon | String | URI of the interactive element's small icon. |
| largeIcon | String | URI of the interactive element's large icon. |

The following attributes are also available for all interactive element layout types (excluding notifications and reminders).

| Field | Type | Function |
| --- | --- | --- |
| primaryColor | String | Six-digit color hexadecimal string or case-insensitive SDK constant (e.g.: "mintgreen"), describing the primary text color. |
| secondaryColor | String | Similar to primaryColor, except applies to the layout's secondary-colored elements. |
| backgroundColor | String | Similar to primaryColor, except applies to the layout's background color. |
| Behavior | String | Program Custom Software executed by the interactive element to create more complex behaviors. |
| Headings | Array of Strings | List of section headings in this layout. The list must be less than 128 characters in length, including the underlying delimiters (one byte) between each item. Longer items will be truncated with an ellipsis ('. . .'). |
| Paragraphs | Array of Strings | List of paragraphs in this layout. Must equal the number of headings. The list should be less than 1024 characters in length, including the underlying delimiters (one byte) between each item. Longer items will be truncated with an ellipsis ('. . .'). |
| lastUpdated | ISO date-time | Timestamp of when the interactive element's data (e.g.: weather forecast or sports score) was last updated. |

FIGS. 5A and 5B illustrate of an embodiment an interactive element configured to represent any of weather details or real time information updates such as sport scores that will be shown on the display screen of the first wearable computing device.

An example interactive element may be of a type of interactive element that represents any of weather details or real time information updates, such as sport scores, and other non-calendar events. These interactive elements are displayed in chronological order with other types of interactive elements on the display screen of the first wearable computing device once the interactive element is pushed to the time synchronous application.

To update an interactive element, the developer's application and/or backend server can send a PUT request with a new JSON object with the same id. For example: PUT https://timeline-api.getpebble.com/v1/user/interactive elements/reservation-1395203

When an update to an existing interactive element can be issued, the update replaces the original interactive element entirely, so all fields (including those that have not changed) should be included.

The module may combine data from multiple different sources but with related information into an interactive element that is then pushed to the time synchronous application. For example, FIG. 5A illustrates the reminder interactive element for a flight to Denver and to the sunset 508 interactive element. By pressing the select input button 516, the user may drill down into the forecast details for the day corresponding to the interactive element for sunset 508. Upon drilldown into either a sunrise element or a sunset 508 element, a weather forecast is displayed for that portion of the day. Under normal operation, the weather forecast is for the local area, in which the wearable computing device 502 is physically located. Drill down into any element may be accomplished by pressing the select input button 516, while the element is aligned correspondingly with the select input button 516.

FIG. 5B is the state of the wearable computing device 502 after the select input button 516 was pressed. The display shows the weather forecast 518 corresponding to the sunrise or sunset selected. In this example, the weather for Denver is going to be 60 degrees Fahrenheit and rainy. The context and content of the reminder interactive element for the flight to Denver, determines whether and how the weather forecast 518 gets updated.

Alternatively, the weather forecast 518 without the context and content of the reminder interactive element for the flight to Denver, would instead not be updated prior to departing and would display the weather forecast information for the current location until the user reacquires locational information upon arriving at the destination. The wearable computing device 502 would not update the weather forecast 518 as the context would indicate no change in location, until arrival. The utilization of the reminder interactive element for the flight to Denver is advantageous in that it allows the user to more effectively use the wearable computing device for planning purposes prior to departure.

Figure 6:
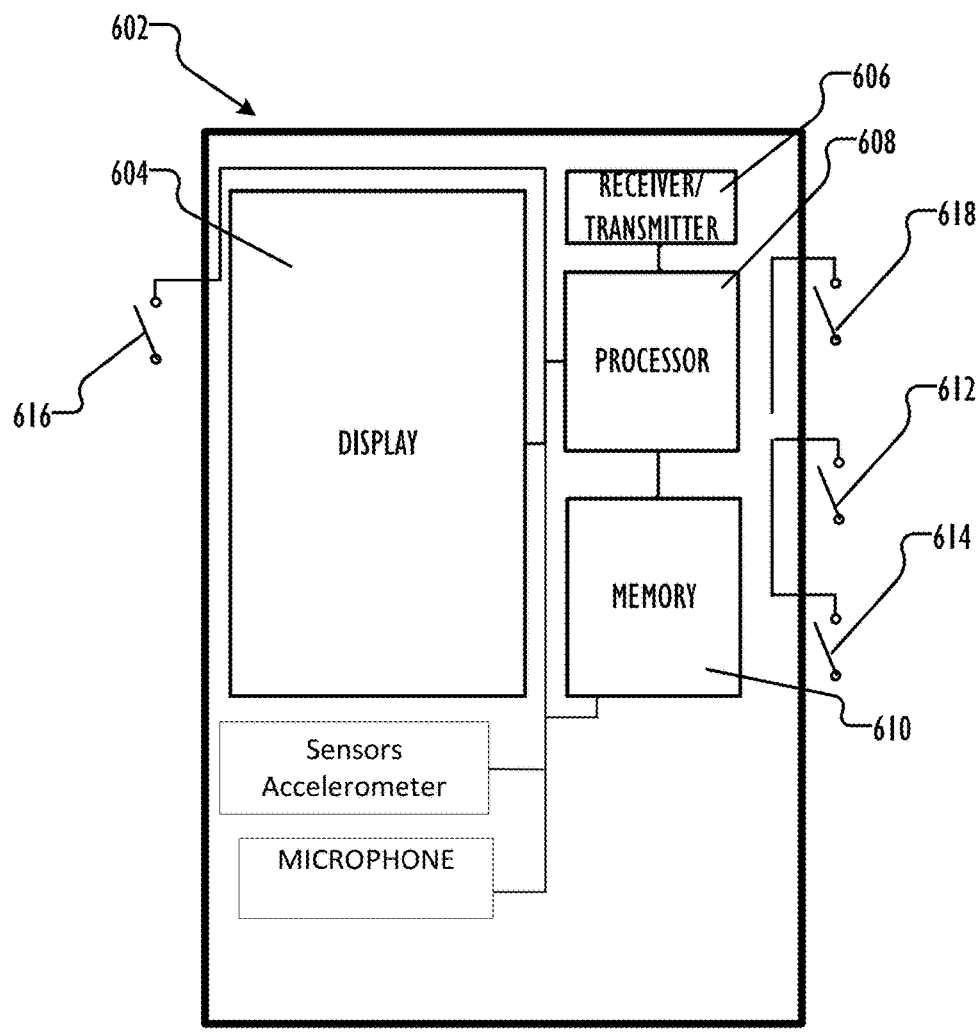
FIG. 6 is a block diagram of an embodiment of a wearable computing device.

FIG. 6 is a block diagram of an embodiment of a wearable computing device. In an embodiment, a memory 610, a processor 608, an input communication circuit 606, and a display screen 604 in the first wearable electronic device 602 all cooperate with each other. The time synchronous application is configured to be resident in the memory 610 of the wearable electronic device 602 and to be executed by the processor 608. The input communication circuit 606 and the time synchronous application cooperate to receive one or more interactive elements. The time synchronous application illustrates contents of the one or more interactive elements on the display screen 604 of the wearable computing device 602.

The processor 608 provides the computational component for the wearable computing device 602. The processor 608 executes the software that manipulates the data structure representation of the unassociated interactive elements. Additionally, the processor 608 carries out any user actions to the unassociated interactive elements.

The processor 608 is coupled to a bi-directional receiver 606. The bi-directional receiver 606 receives and transmits radio frequency messages to any communicatively coupled devices. The bi-directional receiver 606 is the main entry point for any unassociated interactive element.

Additionally, a memory 610 is coupled to the processor 608. The memory 610 hosts the data structure representation of the unassociated interactive elements. The memory 610 additionally contains the software that manipulates the data structure representation and otherwise controls the operation of the wearable computing device 602.

A display 604 is coupled to the processor 608. The display 604 renders the unassociated interactive element s once they have been manipulated by the processor 108 in accordance with the software.

A plurality of input devices 612, 614, 616, 618 are coupled to the processor 608. The input devices 612, 614, 616, 618 are represented as buttons but as discussed could be other input devices. The input devices 612, 614, 616, 618 provide the user an interface to interact with the software executing on the processor 608.

An interactive element is a structured software object with one or more defined fields in which content in at least a first field defines one or more actions that a user of the first wearable computing device can take regarding the first interactive element. Note, the defined fields may also be configured to store different types of information as discussed herein. The memory stores the one or more actions that the user of the first wearable computing device takes regarding the first interactive element. The input communication circuit conveys the one or more actions that the user of the first wearable computing device takes over a network to an action correlation module located in the backend server or mobile device.

The action correlation module evaluates the data including the selected actions taken by user of the first wearable computing device in the first interactive element against any data including any actions taken by user of a second wearable computing device in a second interactive element. The action correlation module then generates a resultant interactive element based on the evaluation of the data of the first interactive element against the data of the second interactive element. The resultant interactive element relates the selectable actions indicated by the first interactive element from the first wearable computing device and the second interactive element from the second wearable computing device. The action correlation module cooperates with its communication circuit to broadcast the resultant interactive element to at least the first wearable computing device and the second wearable computing device.

The input communication circuit of the first wearable computing device is configured to receive the resultant interactive element that relates the selectable actions indicated by the first and second interactive elements. The input communication circuit receives the resultant interactive element from any of i) the backend server connected, directly or indirectly, over a wide area network to the first wearable computing device, ii) an application resident on a mobile computing device that is configured to establish a local communication link with the first wearable computing device to directly cooperate with the first wearable computing device, and iii) an application resident on the second wearable computing device that is configured to establish a local wireless communication link with the first wearable computing device to directly cooperate with the first wearable computing device.

Figure 7:
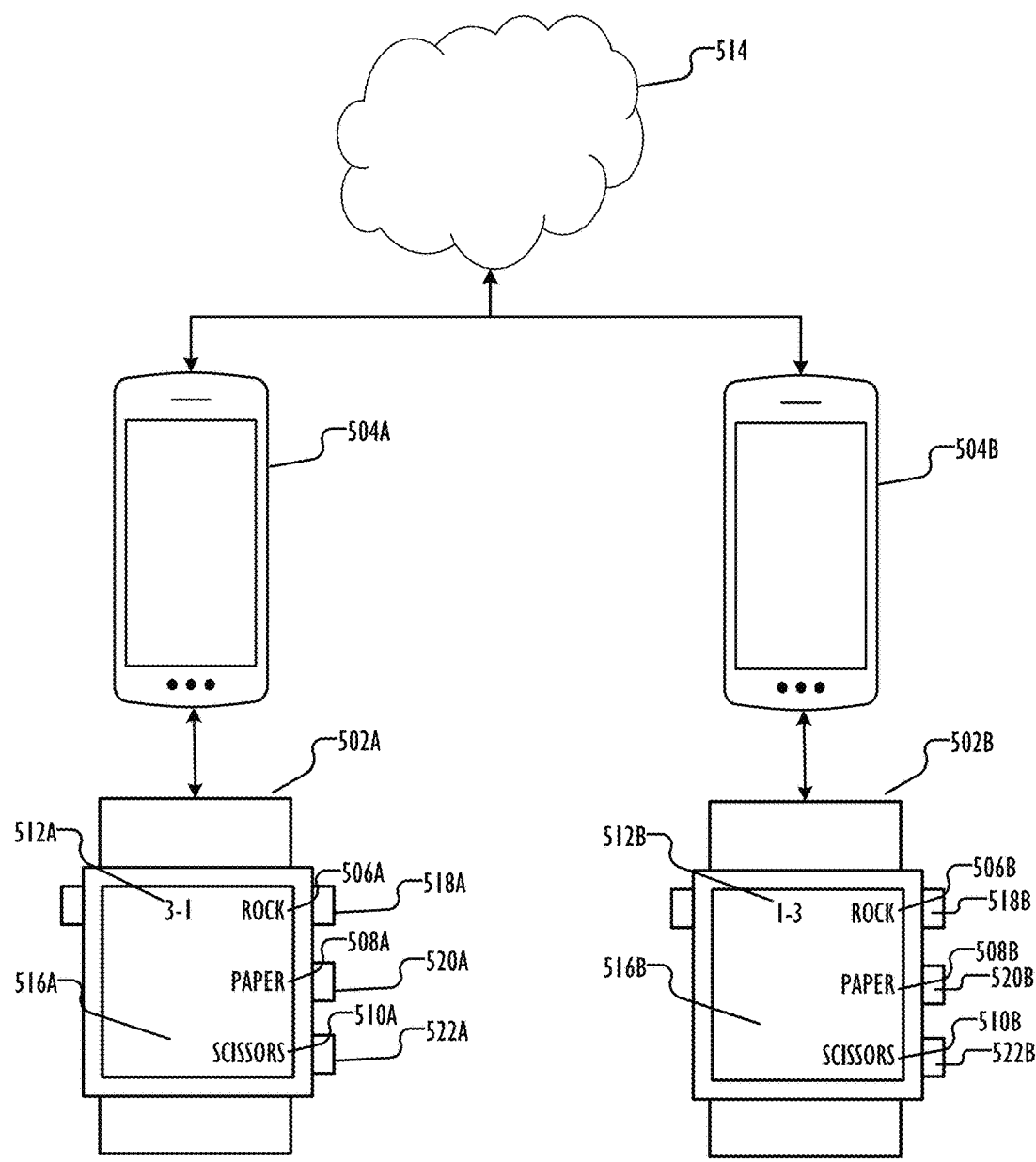
FIG. 7 illustrates a server and/or mobile device configured to relate selectable actions embedded in two or more interactive elements from a plurality of wearable computing devices.

FIG. 7 illustrates a server and/or mobile device configured to relate selectable actions embedded in two or more interactive elements from a plurality of wearable computing devices. One or more processors are located in both a backend server 514 and each mobile computing device 504A, 504B. The processor that relate selectable actions can be located in either the backend server 514 or each of the mobile computing devices 504A, 504B. A relating module is configured to cooperate with the relating processor to enable at least three wearable-computing-device to wearable-computing-device interactions: 1) game playing between two or more people on their wearable computing devices 504A, 504B; 2) polling and voting on choices by a group of people on their wearable computing devices 502A, 502B; and 3) communication from one wearable computing device 502A owner to another wearable computing device owner 502B.

A communication circuit couples to the relating processor. The communication circuit is configured to any of i) connect, directly or indirectly, over a wide area network to an input communication circuit, respectively, of the first and second wearable computing devices 502A, 502B or ii) establish a local wireless communication link with the respective input communication circuits of the first and second wearable computing devices 502A, 502B to directly cooperate with both the first and second wearable computing devices 502A, 502B.

The communication circuit receives the interactive element that includes the data from the first wearable computing device. The communication circuit receives the second interactive element that includes the data from the second wearable computing device. The communication circuit provides the interactive element to the module cooperating with the processor. The communication circuit provides the second interactive element to the module cooperating with the processor. The communication circuit receives the resultant interactive element from the processor that relates the selectable actions indicated by the first and second interactive elements. The communication circuit broadcasts the resultant interactive element to at least the first wearable computing device and the second wearable computing device.

The communication circuit may be located in the mobile computing device, which can be a smart phone. The first and second wearable computing devices can be smart watches. A screen display of the smart watch is updated upon the receipt of the resultant interactive element.

Referring to FIG. 6, in an embodiment, the wearable electronic device 602 is a smart watch which features a black and white Sharp Memory LCD display screen, a programmable CPU, memory, storage, Bluetooth, a vibrating motor, a magnetometer, a microphone, an ambient light sensor, and an accelerometer. These features extend the smart watch's use beyond just displaying the time on the display screen and into many roles including interacting with smartphone notifications, activity tracking, gaming, map display, golf tracking, and more. The smart watch is compatible with Android and iOS devices. When connected to one of these devices via Bluetooth, the smart watch can (but may not need to) pair with that device and vibrate and display text messages, fitness information, emails, incoming calls, and notifications from social media accounts or other accounts, subscriptions or applications. The smart watch can also act as a remote control for the phone function in the paired device, or for other paired devices containing a camera such as the Go Pro. As an example, an associated application store can provide a software development kit (SDK) to develop applications and watchfaces associated with the smart watch.

In another embodiment, the wearable electronic device may be a belt, a necklace, lapel pin, or other form of wearable device.

Figure 8:
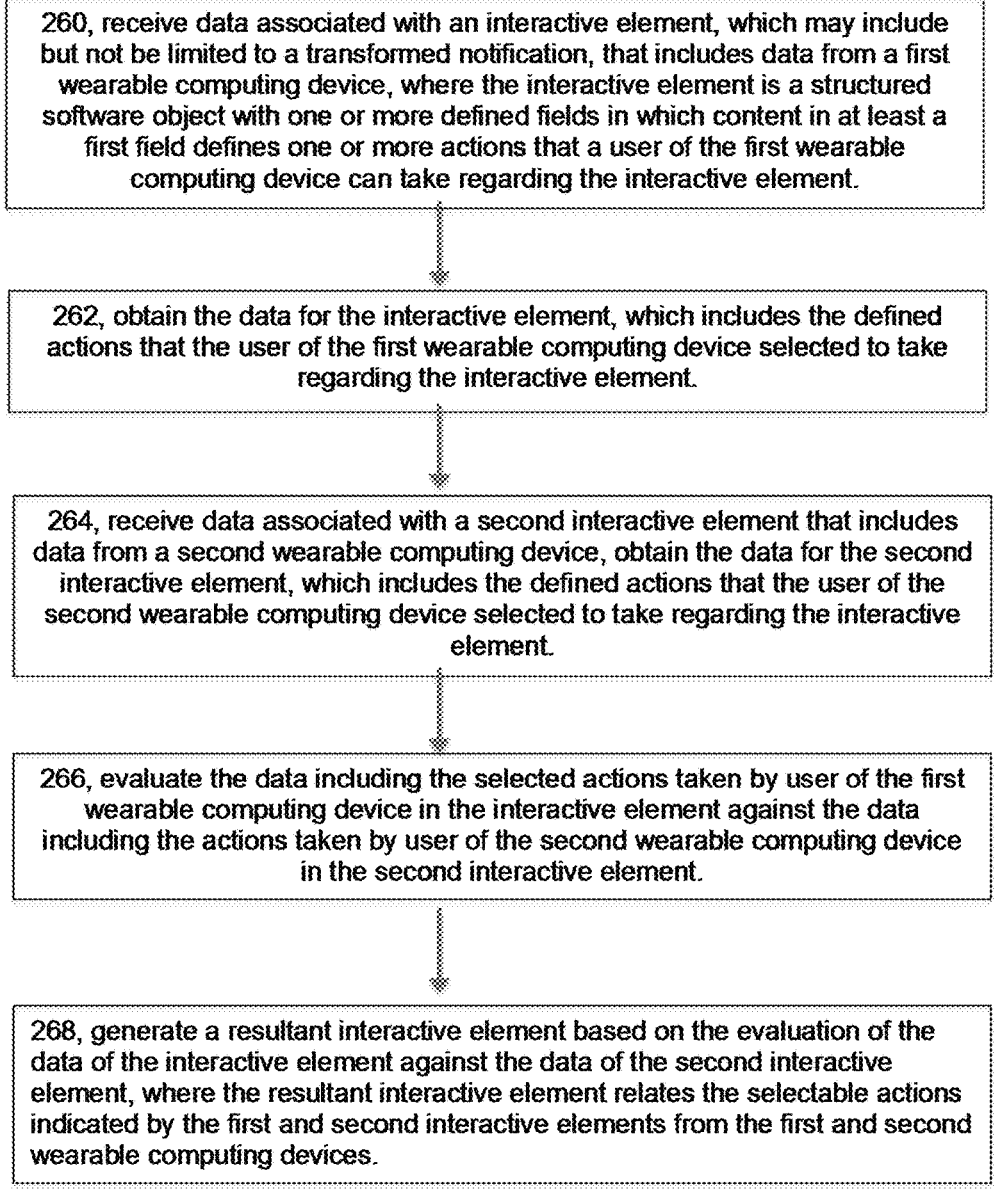
FIG. 8 is a flowchart of an embodiment illustrating a technique for receiving, displaying, and generating interactive elements according to one example.

FIG. 8 is a flowchart of an embodiment illustrating a technique for receiving, displaying, and generating interactive elements according to one example.

A module is configured to cooperate with the processor to perform the following operations.

In 260, the module receives data associated with an interactive element, which may include but not be limited to a transformed notification, that includes data from a first wearable computing device. The interactive element is a structured software object with one or more defined fields in which content in at least a first field defines one or more actions that a user of the first wearable computing device can take regarding the interactive element. The memory is configured to store at least the data associated with the interactive element.

In 262, the module is configured to obtain the data for the interactive element, which includes the defined actions that the user of the first wearable computing device selected to take regarding the interactive element.

In 264, the module receives data associated with a second interactive element, which may include but not be limited to a transformed notification, that includes data from a second wearable computing device. The module is configured to obtain the data for the second interactive element, which includes the defined actions that the user of the second wearable computing device selected to take regarding the interactive element.

In 266, the module evaluates the data including the selected actions taken by user of the first wearable computing device in the interactive element against the data including the actions taken by user of the second wearable computing device in the second interactive element. The module may evaluate as follows. The module classifies the interactive element data as a type based on the interactive element's data's content. The module classifies the second interactive element data as a type based on the second interactive element's data's content. The module verifies the first interactive element data and the second interactive element data are of the same type. The module compares the type of first interactive element data against the type of second interactive element data and determining a relationship between them, where the classification of the first and second interactive elements is based on criteria including content in the interactive element and an originator source of the interactive element.

In 268, the module generates a resultant interactive element based on the evaluation of the data of the interactive element against the data of the second interactive element. The resultant interactive element relates the selectable actions indicated by the first and second interactive elements from the first and second wearable computing devices. The module relates to generate the resultant software object via aggregating, determining, summing, analyzing, correlating, synchronizing, and/or other similar functions, based on evaluating the received data from two or more watches. The interactive elements allow the user of the wearable computing device to communicate feedback to others via flexible user interfaces. Through the relating of actions embedded in the interactive elements, users may interact with other users in real or near real time via concise and intuitive interfaces.

Figure 9:
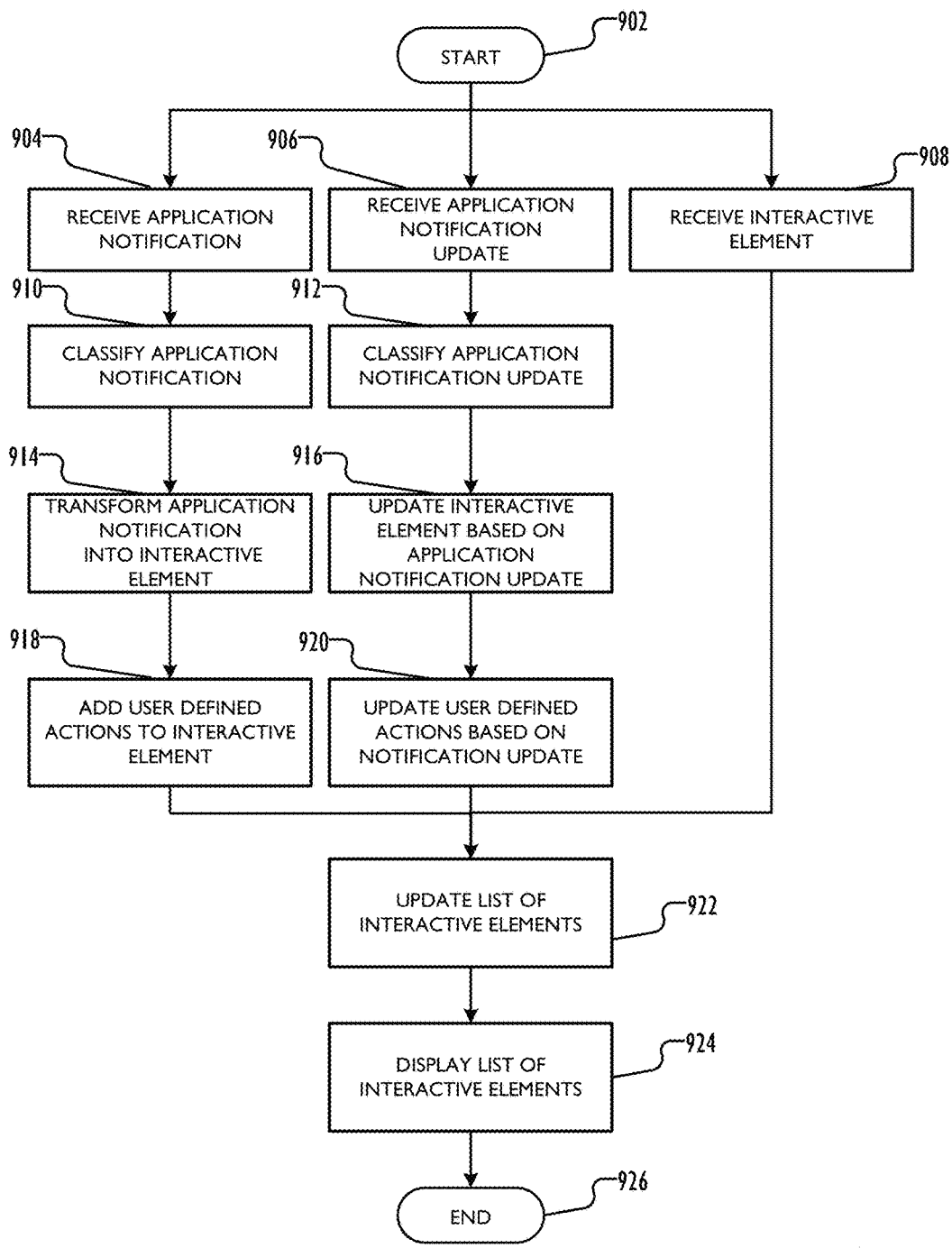
FIG. 9 is a flowchart of an embodiment illustrating a technique for receiving, displaying, navigating, and putting information elements into an interactive element, even for example, interactive elements beginning as a notification, according to one example.

FIG. 9 is a flowchart of an embodiment illustrating a technique for receiving, displaying, navigating, and putting information elements into an interactive element, even for example, interactive elements beginning as a notification, according to one example. A module in the backend server or in a mobile computing device, such as a smart phone, or in the wearable electronic device is configured for receiving, displaying, and navigating interactive elements.

In this example, there are three different types of messages the apparatus can receive: an application notification at block 904, an application notification update at block 906, and an interactive element already in that format at block 908. The processing for each is different, but all processing flows eventually converge.

A first path is as follows.

At block 904, one or more application notifications are received. The application notifications include but are not limited to emails, short message service (SMS) text messages, Facebook notifications, calendar events, and current weather status. Generally, application notifications are notifications that are generated by applications that execute on mobile computing devices or from a backend server.

At block 910, the one or more of the application notifications are classified. The classification of the application notifications utilizes the content and the source of the application notifications to relate to one another. For example, in the most trivial implementation, the application notifications would be classified based on the content and the source, where the source may comprise the sender and the delivery method. An SMS text message example would be classified based on the delivery method, the person who it was from, and the content of the message.

At block 914, the one or more of the application notifications are transformed into interactive elements. A transformation module associated with the public API server formats information into an interactive element and sends them to multiple watches.

The transformation module is configured to i) transform any of a notification from the mobile applications and backend servers, or ii) an update of content in an interactive element transmitted earlier, or iii) format mere content sent to the public API, into a format and structure of an interactive element object, and then send the interactive elements to the time synchronous application resident in the wearable electronic device as well as to at least one other instance the time synchronous application resident in another wearable electronic device.

The interactive element includes that can be but is not limited to being a software object originally formatted as a notification and then transformed into a JSON object with updatable fields. The interactive element can be coded in other software languages as well.

The one or more of the application notifications are converted into a dynamic data structure more suited for handling updates to content as well as display. Subsequently when dealing with more than one interactive element, one should utilize a data structure that can support creating and maintaining lists of the elements.

An interactive element is a software data object that contains all the information required to be displayed on the electronic wearable device in a software language such as JavaScript Object Notation (JSON) object format. The interactive element can contain basic information such as title and times, or more advanced data such as notification data or actions that can be carried out from the interactive element view.

Interactive Element

The table below details example interactive element object fields and their function within the object.

| Field | Type | Function |
|---|---|---|
| Id | String (max. 64 chars) | Developer-implemented identifier for this interactive element event, which cannot be re-used. This means that any interactive element that was previously deleted cannot then be re-created with the same id. |
| Time | String (ISO date-time) | The start time of the event the interactive element represents, such as the beginning of a meeting. See Interactive element Time Limitations for information on the acceptable time range. |
| Duration | Integer number | The duration of the event the interactive element represents, in minutes. |
| createNotification | Notification object | The notification shown when the event can be first created. |
| updateNotification | Notification object | The notification shown when the event can be updated but already exists. |
| Layout | Layout object | Description of the values to populate the layout when the user views the interactive element. |
| Reminders | Reminder object array (Max. 3) | Collection of event reminders to display before an event starts. |
| Actions | Action object array | Collection of event actions that can be executed by the user. An action object could be software executable, and other actionable functions discussed herein |

An example of one implementation of an interactive element is the use of JavaScript Object Notation (JSON). JSON objects provide a simple syntax that it human readable and easy to extend and parse. Below as code example 1 is an example JSON implemented interactive element.

```
{
    "id": "example-element",
    "time": "2015-03-19T18:00:00Z",
    "duration": 12,
    "layout": {
        "type": "genericElement",
        "title": "Lunch?",
        "tinyIcon": "system://images/NOTIFICATION_FLAG"
    }
    "actions": [
        {
            "title": "Wendys",
            "type": "openWatchApp",
            "launchCode": 15
        },
        {
            "title": "McDonalds",
            "type": "openWatchApp",
            "launchCode": 22
        },
        {
            "title": "Burger King",
            "type": "openWatchApp",
            "launchCode": 31
        }
    ]
}
```

At block 918, the interactive element is modified to define associated user interactions, e.g. actions the user may take, based on the classification of the interactive element. For example, if the original application notification that was received, and subsequently transformed into an interactive element classified as a SMS interrogatory requesting lunch suggestions, user actions may take the form of canned "Wendys", "McDonalds", and "Burger King" responses. The responses provided to the possible actions are determined based on the source and content of the original application notification at the time of classification.

All three paths can be as follows.

At block 922, once the interactive element has been created and user defined actions added, the interactive element would necessarily be contained in a list. The implementation of the data structure may have an indexing from one interactive element to the next.

At block 924, the portion of the list of interactive elements is provided to the display. At this point the user may interface with the apparatus.

A second path is as follows.

At block 906, an application notification update is received. Like the application notification, this generally is a notification generated by an application executing on a mobile device. The distinction between the application notification and the application notification update, is that the application notification update follows an application notification and is similar in substance of content and source as the application notification, usually with only minor differences. It is understood that an application notification update comes subsequently to the application notification. It should also be noted that multiple application notification updates may be received and applied in the order in which they are received.

At block 912, the application notification update is likewise given a classification based on criteria including content and source. The classification is to enable a lookup into existing interactive elements that would potentially correspond to the update.

At block 916, the classified application notification update is applied to a corresponding existing interactive element. This involves updating the changed content in the original interactive element so that the interactive element represents the combined application notification and the subsequent application notification update overlaying the original application notification. Thus, the interactive element is a JavaScript Object Notation object that contains the one or more defined fields. An original content exists in the one or more defined fields and is configured when an update of content occurs to overwrite any respective portions of a corresponding field from the original interactive element so that the resultant interactive element being updated contains the fields of both the original content and the updated content.

For example, an interactive element encoded in JSON, fields that are in a subsequent JSON encoded update, will overwrite the corresponding existing fields. Code example 2 is demonstrative of a first JSON interactive element, followed by an update, and the resultant updated interactive element.

```
// The original interactive element
{
    "id": "example-element",
    "time": "2015-03-19T18:00:00Z",
    "duration": 12,
    "layout": {
        "type": "genericElement",
        "title": "Lunch?",
        "tinyIcon": "system://images/NOTIFICATION_FLAG"
    }
    "actions": [
        {
            "title": "Wendys",
            "type": "openWatchApp",
            "launchCode": 15
        },
        {
            "title": "McDonalds",
            "type": "openWatchApp",
            "launchCode": 22
        },
        {
            "title": "Burger King",
            "type": "openWatchApp",
            "launchCode": 31
        }
    ]
}
// the update
{
    "id": "example-element",
    "time": "2015-03-19T18:01:00Z",
    "layout": {
        "title": "Dinner?",
    }
    "actions": [
        {
            "title": "Whataburger",
            "type": "openWatchApp",
            "launchCode": 16
        },
        {
            "title": "ChickFilA",
            "type": "openWatchApp",
            "launchCode": 23
        },
        {
            "title": "Rudys",
            "type": "openWatchApp",
            "launchCode": 35
```

-continued

```
        }
    ]
}
// the updated interactive element
{
    "id": "example-element",
    "time": "2015-03-19T18:01:00Z",
    "duration": 12,
    "layout": {
        "type": "genericElement",
        "title": "Dinner?",
        "tinyIcon": "system://images/NOTIFICATION_FLAG"
    }
    "actions": [
        {
            "title": "Whataburger",
            "type": "openWatchApp",
            "launchCode": 16
        },
        {
            "title": "ChickFilA",
            "type": "openWatchApp",
            "launchCode": 23
        },
        {
            "title": "Rudy",
            "type": "openWatchApp",
            "launchCode": 35
        }
    ]
}
```

Code example 2, above, referenced the original element by its "id" field to match the corresponding field of the update. The fields that exist in the update overwrite the respective portions of the original interactive element so that the resultant updated interactive element contains the fields of both the original and the update.

At block 920, if the application notification update changes the content in a manner in which the previous user defined actions are no longer appropriate, the apparatus will exercise the same logic as used in the adding of the user defined actions to the non-updated interactive element.

As mentioned above, at block 922, the list of interactive elements is constructed, and at block 924 the list of interactive elements is displayed.

A third path may be as follows.

At block 908, an existing interactive element may be received. Also, an existing interactive element may be formed for mere data being received through a process, for example, defined by an application programming interface (API). The API defines what input fields are necessary and the format required. Once the inputs are successfully entered, the server hosting the API, may propagate an interactive element in JSON encoding to the wearable computing device. As the interactive element contains the classification, user defined actions, and is in the proper data structure, no modifications are necessary to utilize it.

At block 922, the received interactive element is inserted directly into the list of interactive elements, and subsequently displayed at block 924.

Referring to FIG. 7, the relating module may promote updates to interactive elements in the resulting interactive element. The relating module in the evaluation compares responses from the multiple wearable devices 502A, 502B to determine a result in a game occurring between, for example, a first instance of a game application on the first wearable computing device 502A using the interactive element and a second instance of the game application on the second wearable computing device 502B using the second interactive element. The relating module then determines the result to be reflected in the game via the resultant interactive element.

Each wearable computing device 502A, 502B has a communication circuit to receive the interactive elements from any of i) the backend server 514 connected, directly or indirectly, over the wide area network to the wearable computing device 502A, 502B, ii) an application resident on a mobile computing device 504A, 504B that is configured to establish a local communication link with that wearable computing device 502A, 502B to directly cooperate with that wearable computing device 502A, 502B and iii) an application resident on a first wearable computing device 502A that is configured to establish a local wireless communication link with a second wearable computing device 502B to directly cooperate with the second wearable computing device 502B.

In this example, an interactive element is implemented in a two player game. Player A and player B interact and the results are promoted to both players' smart watches, updating corresponding portions of the displays. The game consists of user defined actions, and displays that are both partially updated or wholly updated upon the receipt of updates to the interactive element.

This interaction begins at the player A's smart watch 502A. Displayed on player A's smart watch display 516A are three user defined actions 506A, 508A, 510A correspondingly aligned to input devices 518A, 520A, 522A integrated into player A's smart watch 502A.

The display 516A also includes player A's score 512A.

Player A makes a selection from the three user defined actions 506A, 508A, 510A by utilizing the corresponding input device 518A, 520A, 522A located adjacent to the user defined action. This selection constitutes an update to the interactive element. The update is transmitted from the smart watch 502A to the paired smart phone 504A.

Player A's smart phone 504A utilizes a wireless networking connection such as Wi-Fi®, or 4G LTE, to communicate with a server 514.

The relating module can make a comparison of a remote reference identification field from the interactive element data to a local reference identification field from the second interactive element data. The local reference identification field and the remote reference identification field identify the first wearable computing device sending a response, as well as identify the second wearable computing device. The ids can be used to identify both the sender and target device to receive the response in order to facilitate sending the response between wearable computing devices.

The server 514 receives the update to the interactive element containing the selected user defined action 506A, 508A, 510A.

Similarly, player B makes a selection from the three user defined actions 506B, 508B, 510B by utilizing the corresponding input device 518B, 520B. 522B located adjacent to the user defined action. The selection, as an update to the interactive element, is similarly transmitted from the smart watch 502B, to player B's paired smart phone 504B.

Player B's smart phone 504B utilizes a wireless networking connection such as Wi-Fi®, or 4G LTE, to communicate with a server 514.

The server 514 receives the update to the interactive element containing the selected user defined action 506B, 508B, 510B.

The interactive elements displayed on player A's and player B's could take the form of a JSON object presented in code example 4

```
// the interactive element for rock paper scissors
{
    "id": "rock_paper_scissors",
    "time": "3-1",
    "duration": 12,
    "layout": {
        "type": "rockPaperScissors"
        "tinyIcon": "none"
    }
    "actions": [
        {
            "title": "Rock",
            "type": "openWatchApp",
            "launchCode": 1
        },
        {
            "title": "Paper",
            "type": "openWatchApp",
            "launchCode": 2
        },
        {
            "title": "Scissors",
            "type": "openWatchApp",
            "launchCode": 3
        }
    ]
}
```

As exemplified in code example 4, the user selection invokes the application specified by the type field, and provides the launchCode as the input parameter for discrete processing for each user choice. In this example, the invoked application processes the input and sends the response to the server 514.

Internal to the invoked application referenced in code example 4, a unique id would be encoded to identify the local wearable computing device sending the response, as well as the remote targeted device. In another embodiment, the unique id of the local wearable and the unique id of the remote wearable may be encoded in a different field for transmission utilizing a different "type" field.

The server 514 evaluates the two received interactive element updates against each other. In this example, the server 514 determines a winner based on the selection of the three user defined actions of player A and player B.

Upon updating the interactive element with data representing the winner between player A and player B. The server 514 sends an interactive element update to the paired smart phones 504A, 504B of player A and player B. As exemplified in code example 4, only the title field would be updated in the resultant interactive element update as the title reflects the score of the current match between player A and player B.

Player A and player B's respective smart phones 504A, 504B relay the interactive element updates to the respective smart watch 502A, 502B.

Based on the interactive element updates, the displays 516B. 516B of both players' smart watches will be updated. In this example, the score tallies 512A, 512B will be updated to reflect the winner as determined by the server 514.

Figure 10:
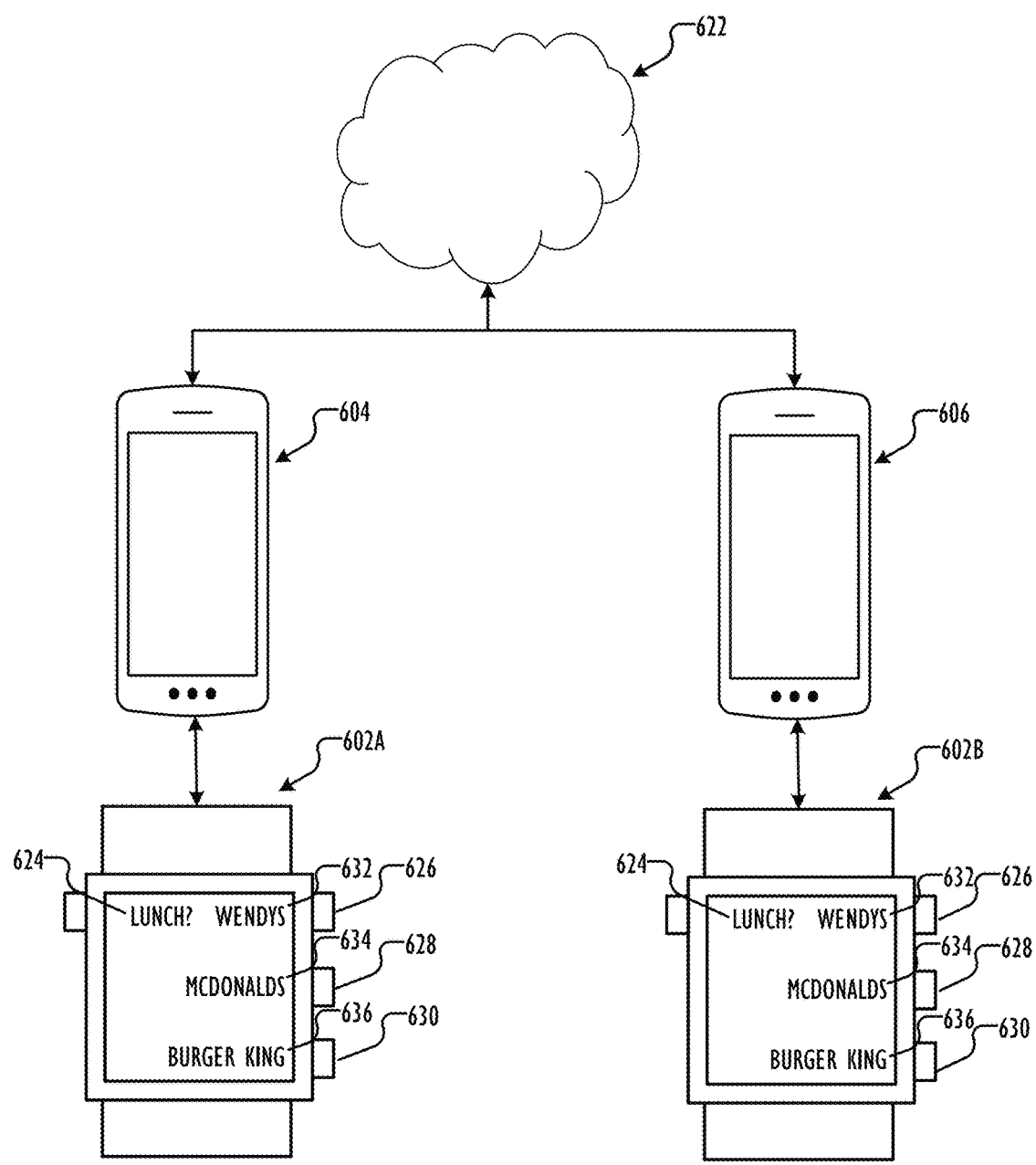
FIG. 10 is block diagram illustrating an embodiment of many wearable electronic devices accepting user input updates to interactive elements and using an action such as a HTTP action.

FIG. 10 is block diagram illustrating an embodiment of many wearable electronic devices accepting user input updates to interactive elements and using an action such as a HTTP action.

While this example only depicts two wearable computing devices 602A, 602B, this embodiment like the other embodiments is scalable to include many wearable computing devices in addition to 602A, 602B. Through the synchronization of actions embedded in the interactive elements, users may interact with other users in real or near real time via concise and intuitive interfaces.

In this example, a server 622 pushes an interactive element with a user defined action to an interrogatory to many connected smart devices 604, 606. The smart devices 604, 606 then relay the interactive element with a user defined action to an interrogatory to an associated wearable computing devices 602A, 602B.

The presented interrogatory 624 is displayed to the user as well as multiple options as responses 632, 634, 636 to the presented interrogatory 624.

Similar to the code example 4 above, this embodiment can be encoded in a JSON object as described below in code example 5.

```
// the interactive element for interrogatory
{
    "id": "lunch_choices",
    "time": "Lunch?",
    "duration": 12,
    "layout": {
        "type": "interrogatory"
        "tinyIcon": "none"
    }
    "actions": [
        {
            "title": "Wendys",
            "type": "http",
            "method": "PUT",
            "url":"http://funpolling.com/lunchmeeting/32423",
            "bodyText": "pollid=12&value=1",
        },
        {
            "title": "McDonalds",
            "type": "http",
            "method": "PUT",
            "url":" http://funpolling.com/lunchmeeting/32423",
            "bodyText": "pollid=12&value=2",
        },
        {
            "title": "Burger King",
            "type": "http",
            "method": "PUT",
            "url":" http://funpolling.com/lunchmeeting/32423",
            "bodyText": "pollid=12&value=3"
        }
    ]
}
```

A difference between the interactive elements in code example 4 and code example 5 is the implementation of the action. In code example 4, an invoked application is processing the launchCode. In code example 5, the action type is "HTTP." This allows the interactive element provide its response directly to the server in a HTTP command, such as a PUT. Utilizing this format, the interactive element can past full argument lists back to the server allowing for more complex processing paths. Note, another action type could be: "ignore http."

Thus, an example defined action that the user can take is an action type in a first field of the first the interactive element of "HTTP." This action allows the interactive element to provide its response directly to the backend server in a HTTP command, and thus, by utilizing this action, the interactive element can pass a full argument list back to the server. With the http action type, the object has configured actions that carry out an arbitrary HTTP request. This makes it possible for a web service to be used purely by pushed interactive elements with actions that respond to those events.

The users select a response 632, 634, 636 from the set of multiple options to the presented interrogatory 624 via an associated input device 626, 628, 630.

The selected responses are then transmitted from the wearable computing devices 602A, 602B to the paired smart devices 604, 606 via a wireless communication standard such as Zigbee®, Bluetooth®, or Wi-Fi®.

The smart devices 604, 606 would then relay the selected response to the server 622 generally through either the smart devices' 604, 606 carrier's mobile data connection such as 4G LTE, or through an internet service provider connected to through Wi-Fi®. The selected responses would be accumulated by the server 622 for processing.

Figure 11:
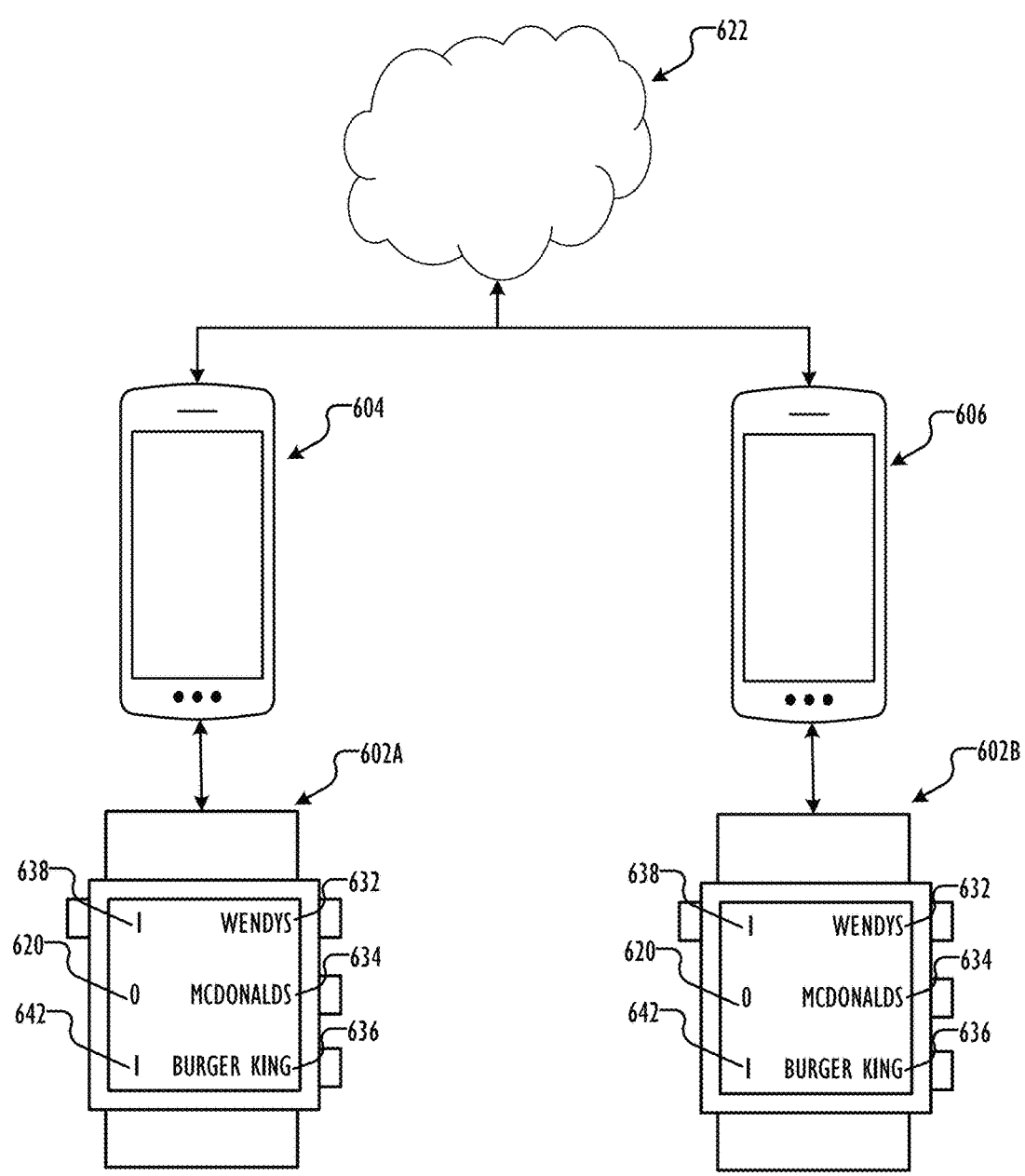
FIG. 11 is block diagram illustrating another embodiment of many wearable computing devices receiving user input updates to and from interactive elements.
Figure 12:
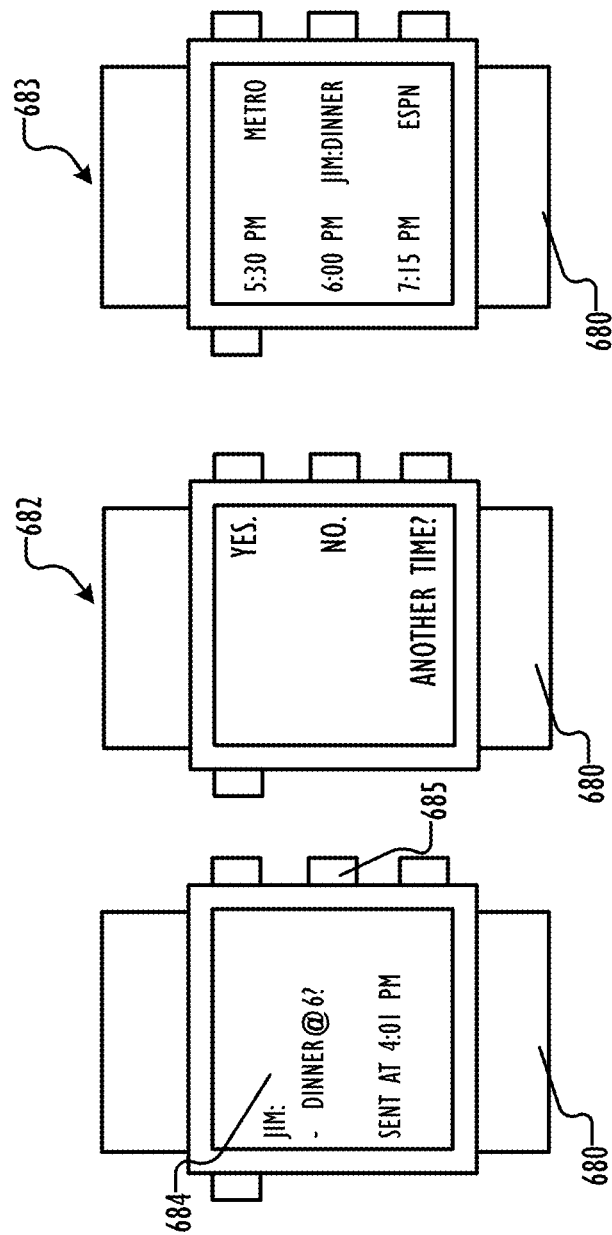

FIG. 11 is block diagram illustrating another embodiment of many wearable computing devices receiving user input updates to and from interactive elements.

The relation module cooperates with the communication circuit to broadcast an interrogatory to a plurality of wearable computing devices including the first and second wearable computing devices 602A, 602B. The communication circuit transmits the interrogatory to the plurality of wearable computing devices 602A, 602B, and the interactive elements, including the first and second, from the plurality of wearable computing devices 602A, 602B that are responsive to the interrogatory.

The module in the evaluation aggregates the data of the two or more interactive elements to determine a polling of the users of at least the first and second wearable computing devices 602A, 602B selections of predetermined options available and the module provides a summation and aggregation of the selected predetermined options in the resultant interactive element.

The relation module cooperates with the communication circuit to broadcast the resultant software object with the related data responses back to the two or more watches.

Upon receiving the selected responses 632, 634, 636 the server 622 identifies that the selected responses 632, 634, 636 are directed at the initially transmitted interrogatory.

The server 622 collates the selections of the set of selected responses 632, 634, 636. The server 622 then sums each collated group of selections of the set of selected responses 632, 634, 636.

The sums are inserted into an interactive element update, and transmitted to the smart devices 604, 606. The interactive element update is further relayed to the wearable computing device 602A, 602B. As displayed in code example 5, the action tags are disabled on update by either the omission of a type, or the effect of the "type" plus "launchCode" or http implementation essentially being a non-operation. In this example that would disallow multiple responses from the same user.

The interactive element updates portions of the display of the wearable computing device that have changed. The summations 638, 620, 642 of the selected responses 632, 634, 636 have replaced the displayed interrogatory 624. The summations 638, 620, 642 correspond to the selected responses 632, 634, 636 received by the server in response to the initial interrogatory interactive element.

The wearable computing device embodied in a smart watch form is designed to accept application notifications, interactive elements, and updates to the interactive elements. The interactive elements allow the user of the wearable computing device to communicate feedback to others via flexible user interfaces. Through the synchronization of actions embedded in the interactive elements, users may interact with other users in real or near real time via concise and intuitive interfaces.

The module is configured to cooperate with a network adaptor to broadcast the resultant interactive element showing the current summation and aggregation to at least one or more wearable computing device that have not yet sent an interactive element to the communication circuit. The module broadcasts the current results to everyone in the group.

The relating module correlates a relationship of the data including the actions taken by user of the first wearable computing device 602A and correspondingly indicated by the interactive element and the data including the actions taken by user of the second wearable computing device 602B and correspondingly indicated by the second interactive element. The correlation may further include the following.

The relating module extracts a local reference identification field from the interactive element data pertaining to the first wearable computing device 602A.

The relating module extracts a remote reference identification field from the interactive element data pertaining to the second wearable computing device 602B.

The relating module compares the local reference identification field from the interactive element data to the remote reference identification field from the second interactive element data.

The local reference identification field and the remote reference identification field identify the first wearable computing device 602A sending a response, as well as identify the second wearable computing device 602B targeted to receive the response in order to facilitate sending the response between wearable computing devices 602A, 602B.

FIGS. 12A, 12B, and 12C are illustrations of an embodiment demonstrating a technique for receiving interactive elements and taking an action in the interactive element.

The wearable computing device 680 receives an interactive element. The interactive element 684 in this example is a message with a request for dinner from a known contact.

In this example, the wearable computing device 680 determines what kind of interactive element 684 it is based on meta-data surrounding the interactive element 684. Usually the meta-data includes the message's source and the content. In this example, the interactive element 684 came from a SMS text message, the wearable computing device 680 determines the response is a SMS text message directed back to the sender. Based on the content, the wearable computing device 680, can additionally determine and present the user with a few options for actionable responses.

Upon receiving the interactive element 684, the user may select to view some wearable computing device 680 responses by pressing the "select" button 685. The select button 685 moves the display into a selection display state 682 presenting the user with options of actionable responses to the reception of the interactive element 684. The possible actionable responses to the dinner invite include "yes," "no," and "another time." Alternatively, other methods of input may be implemented to move the view into the selection display state 682.

The selection display state 682 presents the user with a few options to quickly respond in an applicable way based on the content and source of the received interactive element 684. In this instance, the received interactive element 684 came from a SMS text message, so the response would be a SMS text message. For other interactive element 684 types, such as emails, the response correspondingly would match.

Each action may be identified in the interactive element as a nested JSON object identified with the "action" keyword. The "action" JSON object may comprise two or more data members including title and type. Upon a yes to the dinner invite the dinner with Jim is added to the chronological listing in the time synchronous application.

The interactive element may be of an example type of interactive element representing a notification sent or updated by the mobile applications or the remote back end server. The interactive element will be shown on the display screen of the first wearable computing device once the interactive element is pushed to the time synchronous application. The interactive element has one or more actionable functions programmed into a container of the interactive element on how to respond to the notification, so the user can take the actionable function directly from the displayed interactive element without having to go to another application to take the actionable function. For example, the user does not have to open their SMS text application on the mobile device or on the wearable electronic device in order to respond with "yes," "no," or "another time."

Figure 13:
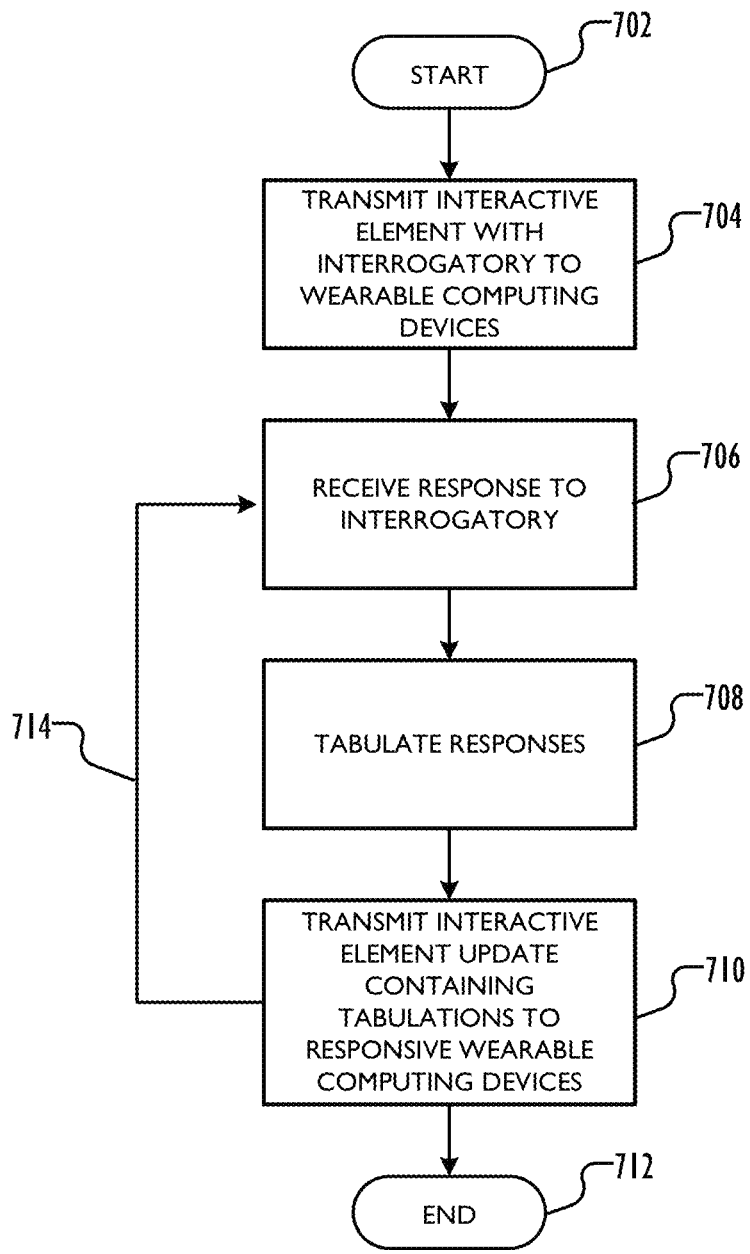
FIG. 13 is a flowchart of an embodiment illustrating a technique for receiving, processing, updating, and broadcasting interactive elements.

FIG. 13 is a flowchart of an embodiment illustrating a technique for receiving, processing, updating, and broadcasting interactive elements.

The flow begins with the server transmitting an interactive element to a wearable computing devices 704. The interactive element can take the form of a JSON object with included actions. The transmission may be accomplished by communication protocol operable to deliver JSON objects. An example JSON object would be a string comprising an interrogatory that poses a multiple choice question, and associated actions corresponding to a set of answers to the multiple choice question. Code example 4 and code example 5 would be examples of implementation.

The interactive element is transmitted to the wearable computing device, where it is displayed and the user may interact with the interactive element at their leisure. Once the user has selected one of the answers from the set of answers to the multiple choice question, the related action is executed, and propagated back to the server. As mentioned in code example 4 and code example 5, the method of providing this is flexible. Interactive elements allow for proprietary apps to handle processing, or the use of a HTTP implementation have been discussed.

The server then receives the response to the interrogatory 706. As the transmission was broadcast to more than one wearable computing devices, this block in the flowchart will be performed for each response selected by a user.

Upon receipt of the response to the interrogatory, the server then tabulates responses 708 from all of the wearable computing devices that have responded. The tabulation comprises summing the responses of any given selection from the set of answers to the interrogatory.

Upon completing the tabulation, the server then transmits an interactive element update containing tabulations of the received responses to the responsive wearable computing devices 710. The interactive element updates replace the previously transmitted interactive element with the interrogatory component. The wearable computing devices that have transmitted responses should then display the results of the tabulations and no longer display the interrogatory. Non-responsive wearable computing devices do not receive the update continue to display the interrogatory prompt.

Thus, the relating module collates the selections of the user from a set of selectable responses and then the relating module sums each collated group of selections of the set of selectable responses and provides the summations and/or replacements in the resultant interactive element.

As each wearable computing device responds, the system repeats the process 714. This allows the responsive wearable computing devices to view the tabulation of the responses being transmitted by the responding wearable computing devices as they are processed.

As mentioned above, past attempts at providing elegant and functional wearable computing experience have been insufficient. Utilizing a wearable computing device embodied in a smart watch form allows a user to receive application notifications, interactive elements, and updates to the interactive elements. The interactive elements allow the user of the wearable computing device to communicate feedback to others via flexible user interfaces. Through the synchronization of actions embedded in the interactive elements, users may interact with other users in real or near real time via concise and intuitive interfaces. All of which act in concert to provide the user with a robust yet concise interface in a wearable.

It is to be understood that the above description is intended to be illustrative, and not restrictive. For example, the above-described examples may be used in combination with each other. Many other examples will be apparent to those of skill in the art upon reviewing the above description. The scope of the invention therefore should be determined with reference to the appended claims, along with the full scope of equivalents to which such claims are entitled.

What is claimed is:

1. A first wearable electronic device, comprising:
   a memory, a processor, a communication circuit, and a display screen in the first wearable electronic device, which are all configured to cooperate with each other,
   where a time synchronous application is configured to be resident in the memory of the first wearable electronic device and to be executed by the processor,
   where the communication circuit and the time synchronous application cooperate to receive one or more interactive elements, and the time synchronous application is configured to illustrate contents of the one or more interactive elements on the display screen of the first wearable electronic device,
   where the time synchronous application illustrates contents of the one or more interactive elements, chronologically ordered in a context of time, into a logical order of displayed interactive elements on the display screen,
   where the time synchronous application is configured to display different types of content from all three of
   i) timely and relevant data,
   ii) calendar events, and
   iii) portions of or whole notifications
   from the one or more interactive elements, chronologically ordered in the context of time, within the time synchronous application,
   where the communications circuit and time synchronous application are configured to receive the one or more interactive elements from multiple different data sources, including one or more mobile applications and one or more remote backend servers,
   where the time synchronous application is configured to provide updated content to the one or more interactive elements from new content received from one or more of the multiple different data sources, where an existing interactive element, that was previously displayed, is updated with the new content, and when updated then placed in chronological order based on the context of time associated with the new content,
   where the time synchronous application cooperates with the interactive elements so that the user does not need to leave the time synchronous application to go into another application in order to view the contents of the interactive element and take actions in response to the displayed contents;
where the communications circuit is configured to receive the one or more interactive elements over a network from
  i) a public application programming interface hosted on a server,
  ii) one or more mobile applications resident on one or more mobile computing devices, or
  iii) one or more remote backend servers; and
where an emulator on the server hosting the public application programming interface is configured to emulate the time synchronous application in order to support all of the instances of the time synchronous application by having code to automatically chronologically order all of the interactive elements from the one or more remote backend servers in the ordered context of time,
where all of the interactive elements from the one or more remote backend servers are stored in a memory cooperating with the server,
where the chronological ordering occurs on a set periodic basis,
  where at least a chronological order of all of the interactive elements stored in the memory are pushed to individual instances of the time synchronous application using the server.

2. The wearable electronic device of claim 1,
where the time synchronous application is configured to cooperate with at least a first mobile application of the one or more mobile applications,
where the first mobile application is configured to generate and
  1) send interactive elements directly to the time synchronous application on the wearable electronic device or
  2) send at least content for the interactive elements to the public application programming interface, and
where the public application programming interface is configured to cooperate with a first module to
  i) review the interactive elements,
  ii) transform the at least content into a format of a first interactive element, if needed, and
  iii) send the one or more interactive elements to the time synchronous application resident in the first wearable electronic device, directly or indirectly via the one or more mobile applications.

3. The wearable electronic device of claim 2,
where the public application programming interface is hosted on the server,
where the public application programming interface is configured to send the one or more interactive elements over a network to a first application on a first mobile device, and the communications circuit is configured to receive the one or more interactive elements over a local area network from the first application on the first mobile device; and thus, in this implementation, the public application programming interface, via the first application, is the source pushing the one or more interactive elements into the time synchronous application on the first wearable electronic device.

4. The wearable electronic device of claim 1,
where a first module is configured to all three of
  i) transform a first notification from either a first mobile application or a first backend server into a format of a second interactive element,
  ii) perform the updating of the new content in the second interactive element transmitted earlier, and
  iii) format the new content sent to the public application programming interface, into a format and structure of the second interactive element object, and then send a first instance of the second interactive element to the time synchronous application resident in the first wearable electronic device, where the first module is also configured to send a second instance of the second interactive element to at least one other instance the time synchronous application resident in another wearable electronic device.

5. The wearable electronic device of claim 1,
where the public application programming interface also has an intelligence routine configured to be flexible enough to enable pushing the one or more interactive elements to the first wearable electronic device in one or more of the following distinct ways:
  i) push a first interactive element, in mass, to all instances of the time synchronous application resident on their corresponding wearable electronic devices, including the first wearable electronic device, that cooperate with a first application that is the source of the content in the first interactive element being pushed;
  ii) push the first interactive element to merely a first subset of instances of the time synchronous application resident on their corresponding wearable electronic devices, including the first wearable electronic device, that cooperate with the first application that is the source of the content in the first interactive element being pushed,
    where the first subset is determined by use of a selection criteria in the first application to allow users to subscribe to different topics within the first application to customize their experience and merely receive interactive elements with content on the selected topics they have subscribed to see; and
  iii) push the first interactive element to merely a second subset of instances of the time synchronous application on the plurality of wearable electronic devices, including the first wearable electronic device, that cooperate with the first application that is the source of the content in the first interactive element being pushed,
    where the second subset is individually selected targeted users and determined by based on any of
      A) meta data known about each selected targeted user corresponding to content of the first interactive element being pushed,
      B) a token that corresponds to a custom list of target individuals that have an instance of the first application, and
      C) any combination of these two.

6. The wearable electronic device of claim 5,
where the intelligence routine is configured to push the first interactive element in all three of the above distinct ways to the time synchronous application.

7. The wearable electronic device of claim 1,
where a first mobile application resident on a first mobile device is configured and responsible for chronologically ordering in the context of time,
  i) all of the interactive elements for the instance of the time synchronous application in the first wearable electronic device with ii) all possible interactive elements that are currently available in a database in the cloud, which the instance of the time synchronous application in the first wearable electronic device is configured to make the interactive elements visible on the display screen of the first wearable electronic device.

8. The wearable electronic device of claim 1,
where a first interactive element is a software data object that has
one or more fields to contain information including one or more types of information selected from title information and time information, or
more advanced data including notification data, or actionable functions that can be carried out from a first view without having to open another application,
where the software data object also has multiple layouts each containing and displaying different sets of conveyed information,
where each layout allows a user of the time synchronous application to activate on an element of the interactive element to change from a base layout view and get a more detailed layout view of the interactive element and its corresponding data content.

9. The wearable electronic device of claim 1,
where a first interactive element has two or more layout objects, which each layout object contains a view layout and reference to one or more fields containing content to be conveyed and shown in that layout object, in order to allow a resulting set of layout objects of first interactive element to be customized in the content conveyed.

10. The wearable electronic device of claim 9,
where the time synchronous application has a graphical user interface that is configured to reveal information in the form of an interactive element object that a user of the first wearable electronic device wants to see ordered in the context of time,
where the interactive element object has the multiple layouts in different visual formats to allow the graphical user interface to display just the right amount of information for user of the wearable electronic device in the moment, and is actionable to expand window to see more information.

11. The wearable electronic device of claim 1,
where a first interactive element is a first type of interactive element configured to represent a notification sent or updated by the mobile applications or the remote back end servers, and will be shown on the display screen of the first wearable electronic device once the first interactive element is pushed to the time synchronous application,
where the first interactive element has one or more actionable functions programmed into a container of the interactive element on how to respond to the notification, so the user can take the actionable function directly from the displayed interactive element without having to go to another application to take the actionable function.

12. The wearable electronic device of claim 1,
where a first interactive element is a first type of interactive element configured to represent any of weather details or real time information updates including sport scores and will be shown on the display screen of the first wearable electronic device once the first interactive element is pushed to the time synchronous application.

13. The wearable electronic device of claim 1,
where a first interactive element is a first type of interactive element configured to represent a specific event in the past, the present, or the future, originally sent or later updated from one or more of the multiple different data sources will be shown on the display screen of the first wearable electronic device once the interactive element is pushed to the public web application programming interface and then forwarded onto the wearable electronic device to be chronologically ordered into logical order of displayed interactive elements on the time synchronous application,
where the time synchronous application has a graphical user interface that is configured to reveal information in the form of an interactive element object that is actionable and displays one or more programmed actions for the user to take based on content in the interactive element, where the time synchronous application is configured to cooperate with the communication circuit to convey the one or more programmed actions that the user of the first wearable electronic device takes over a network to an action correlation module located in either a first remote backend server or a first mobile electronic device, where the action correlation module is configured to evaluate the one or more programmed actions taken by user of the first wearable electronic device and then cause that action to occur.

14. The wearable electronic device of claim 1,
where a first module is configured to combine data from multiple different sources but with related information into a first interactive element that is then pushed to the time synchronous application.

15. The wearable electronic device of claim 1,
where a first interactive element is a software data object that contains all of the information required to be displayed on the wearable electronic device, and is coded in the JavaScript Object Notation object format,
where the first interactive element has one or more fields to contain basic information including one or more types of basic information selected from title information and time information, as well as one or more fields that contain actionable functions that can be carried out from a view of the interactive element,
where the actionable functions includes one or more programmed mechanisms on how to respond to a notification or an event conveyed by the interactive element,
where the first wearable electronic device is a smart watch.

16. The wearable electronic device of claim 1,
where a first application on a first mobile device is configured to be responsible for inserting interactive elements directly into the time synchronous application on the first wearable electronic device; and thus, the interactive elements originate on the mobile device and are sent straight to the first wearable electronic device, not via the public application programming interface.

17. The wearable electronic device of claim 1,
where the time synchronous application is configured to display the interactive elements on the display screen, and
where the time synchronous application is configured to cooperate with one or more software based buttons or physical buttons, a scrolling mechanism, or a rotating mechanism for the wearable electronic device in order to scroll forward in time as well as backward in time in the chronological order of the interactive elements.

18. A method of generating and sending interactive elements to a plurality of wearable electronic devices, comprising:
    generating and sending one or more interactive elements over a network from any of
        i) a public application programming interface hosted on a server,
        ii) one or more mobile applications resident on one or more mobile computing devices, and
        iii) one or more remote backend servers; or and
    where the interactive elements are routed as follows:
        1) the one or more interactive elements are directly routed from either a first mobile application or a first backend server to an instance of a time synchronous application on its own wearable electronic device,
        2) the one or more interactive elements are routed through the public application programming interface to the instance of the time synchronous application on its own wearable electronic device, or
        3) the one or more interactive elements are routed through the public application programming interface to the one or more mobile applications and then to the instance of the time synchronous application on its own wearable electronic device, and when the one or more interactive elements are sent over the public application programming interface, then generating and sending at least content for the interactive elements to the public application programming interface,
    where the public application programming interface is configured to cooperate with a first module to
        i) review the interactive elements,
        ii) transform the at least content into a format of a first interactive element, if needed, and
        iii) send the one or more interactive elements to the instances of the time synchronous applications resident in their wearable electronic devices directly or indirectly via the mobile application;
    where the mobile applications and the remote backend servers send information in the interactive elements to the instances of the time synchronous application resident in their wearable electronic device in order to bring different types of content including one or more types of content selected from timely and relevant data, events, and notifications to a user of that wearable electronic device without the user's intervention to actively retrieve the different types of content, and
    where the time synchronous application is configured to provide updated content to the one or more interactive elements from new content received from one or more of the multiple different data sources, where an existing interactive element, that was previously displayed, is updated with the new content, and when updated then placed in chronological order based on the context of time associated with the new content;
pushing the one or more interactive elements to the first wearable electronic device, via the public application programming interface, where the public application programming interface is configured to have a capability of pushing the interactive elements in all three of the following distinct ways
    1) pushing a first interactive element, in mass, to all instances of the time synchronous application resident on their corresponding wearable electronic devices, including the first wearable electronic device, that cooperate with a first application that is the source of the content in the first interactive element being pushed;
    2) pushing the first interactive element to merely a first subset of instances of the time synchronous application resident on their corresponding wearable electronic devices, including the first wearable electronic device, that cooperate with the first application that is the source of the content in the first interactive element being pushed, where the first subset is determined by use of a selection criteria in the first application to allow users to subscribe to different topics within the first application to customize their experience and merely receive interactive elements with content on the selected topics they have subscribed to see; and
    3) pushing the first interactive element to merely a second subset of instances of the time synchronous application on the plurality of wearable electronic devices, including the first wearable electronic device, that cooperate with the first application that is the source of the content in the first interactive element being pushed,
        where the second subset is individually selected targeted users and determined by based on any of
            A) meta data known about each selected targeted user corresponding to content of the first interactive element being pushed,
            B) a token that corresponds to a custom list of target individuals that have an instance of the first application, and
            C) any combination of these two.

* * * * *